United States Patent
Mino et al.

(10) Patent No.: US 7,974,502 B2
(45) Date of Patent: Jul. 5, 2011

(54) OPTICAL MODULE AND OPTICAL SWITCH

(75) Inventors: Shinji Mino, Atsugi (JP); Takeshi Kitagawa, Yokohama (JP); Motohaya Ishii, Atsugi (JP); Takashi Yamada, Atsugi (JP); Akira Himeno, Ibaraki (JP); Masayuki Okuno, Hitachinaka (JP); Shunichi Souma, Yamato (JP); Takashi Goh, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 11/678,175

(22) Filed: Feb. 23, 2007

(65) Prior Publication Data

US 2007/0154137 A1 Jul. 5, 2007

Related U.S. Application Data

(60) Continuation of application No. 11/258,713, filed on Oct. 26, 2005, now Pat. No. 7,206,473, which is a division of application No. 10/675,391, filed on Sep. 30, 2003, now Pat. No. 6,999,652.

(30) Foreign Application Priority Data

Nov. 6, 2002 (JP) .................................. 2002-323044
Nov. 25, 2002 (JP) .................................. 2002-341334

(51) Int. Cl.
*G02F 1/295* (2006.01)
*G02F 1/01* (2006.01)
*G02B 6/26* (2006.01)
*G02B 6/42* (2006.01)

(52) U.S. Cl. ............................... 385/4; 385/22; 359/288
(58) Field of Classification Search .................. 359/288; 385/4, 22
See application file for complete search history.

(56) References Cited

U.S. PATENT DOCUMENTS

| 4,618,210 | A | 10/1986 | Kondo |
| 5,185,830 | A | 2/1993 | Nishimoto |
| 5,757,990 | A | 5/1998 | Miyakawa |
| 5,892,864 | A | 4/1999 | Stoll et al. |
| 6,122,416 | A | 9/2000 | Ooba et al. |
| 6,188,815 | B1 | 2/2001 | Schiaffino et al. |
| 6,330,379 | B1 | 12/2001 | Hendriksen |

(Continued)

FOREIGN PATENT DOCUMENTS

JP 60-032030 2/1985

(Continued)

OTHER PUBLICATIONS

Henry H. Yaffe et al., *Polarization-Independent Silica-on-Silicon Mach-Zehnder Interferometers*, Journal of Lightwave Technology, vol. 12, No. 1, Jan. 1994, pp. 64-67.

(Continued)

*Primary Examiner* — Uyen-Chau N Le
*Assistant Examiner* — John M Bedtelyon
(74) *Attorney, Agent, or Firm* — Workman Nydegger

(57) ABSTRACT

An optical module controls its output characteristics electrically and an optical switch constitutes the optical module. An optical waveguide circuit (PLC) and an electronic circuit (IC) for driving the PLC are mounted on the same substrate. The IC is composed of a bare chip to be molded afterward. Wiring of the IC is grouped and integrated on the PLC substrate to achieve higher density and miniaturization of the optical module.

13 Claims, 23 Drawing Sheets

U.S. PATENT DOCUMENTS

| | | | |
|---|---|---|---|
| 6,334,011 | B1 | 12/2001 | Galvanauskas et al. |
| 6,389,191 | B1 | 5/2002 | Borreman et al. |
| 6,408,112 | B1 | 6/2002 | Bartels |
| 6,597,830 | B1 | 7/2003 | Nakabayashi et al. |
| 6,650,802 | B1 | 11/2003 | Morse et al. |
| 6,687,427 | B2 | 2/2004 | Ramalingam et al. |
| 6,785,434 | B2 | 8/2004 | Castoldi et al. |
| 6,832,011 | B2 * | 12/2004 | Doerr ................................ 385/3 |
| 2002/0076142 | A1 | 6/2002 | Song |
| 2005/0058416 | A1 | 3/2005 | Hoon Lee et al. |

FOREIGN PATENT DOCUMENTS

| | | |
|---|---|---|
| JP | 05-053157 | 3/1993 |
| JP | 06-003556 | 1/1994 |
| JP | 06-067044 | 3/1994 |
| JP | 08-036195 | 2/1996 |
| JP | 11-084435 | 3/1999 |
| JP | 2000-032510 | 1/2000 |
| JP | 2000-258808 | 9/2000 |
| JP | 2000-267145 | 9/2000 |
| JP | 2000-321514 | 11/2000 |
| JP | 2002-014242 | 1/2002 |
| JP | 2002-189140 | 7/2002 |
| JP | 2002-241577 | 8/2002 |
| JP | 2002-267862 | 9/2002 |
| WO | WO 96/08932 | 3/1996 |

OTHER PUBLICATIONS

Yasuyuki Inoue et al., *Elimination of Polarization Sensitivity in Silica-Based Wavelength Division Multiplexter Using a Polyimide Half Waveplate*, Journal of Lightwave Technology, vol. 15, No. 10, Oct. 1997, pp. 1947-1957.

R. Kasahara et al., *A Compact Optical Wavelength Selector Composed of Arrayed-Waveguide Gratings and an Optical Gate Array Integrated on a Single PLC Platform*, IEEE Photonics Technology Letters, vol. 12, No. 1, Jan. 2000, pp. 34-36.

T. Goh et al., *Large-Scale Integrated Silica-Based Thermo-Optic Switches*, NTT Review, vol. 13, No. 5, 2001, pp. 18-25.

T. Watanabe et al., *Silica-Based PLC 1×128 Thermo-Optic Switch*, Proc. 27$^{th}$ ECOC '01, Tu. L. 1. 2., Amsterdam, 2001.

S. Mino et al., *Novel IC-on-PLC Technology and its Application to Compact 1×128 Silica-Based PCL Switch*, Proc. of OFC 2003, TuE2, Atlanta, 2003.

T. Shibata et al., *Silica-Based 16×16 Optical Matrix Switch Module with Integrated Driving Circuits*, Proc. of OFC 2001, WR1-1, Ahaheim, 2001.

T. Goh et al., *Low Loss and High Extinction Ratio Strictly Nonblocking 16×16 Thermooptic Matrix Switch on 6-in Wafer Using Silica-Based Planar Lightwave Circuit Technology*, Journal of Lightwave Technology, vol. 19, No. 3, Mar. 2001, pp. 371-379.

T. Goh et al., *Scalable 128×128 Optical Switch System Composed of Planar Lightwave Circuit and Fiber Sheet for Optical Crossconnect*, Proc. 28$^{th}$, ECOC 2002, Copenhagen, pp. 6.2.7.

* cited by examiner

US 7,974,502 B2

OPTICAL MODULE AND OPTICAL SWITCH

CROSS-REFERENCE TO RELATED APPLICATIONS

This application is a continuation of U.S. patent application Ser. No. 11/258,713, filed Oct. 26, 2005 (now U.S. Pat. No. 7,206,473), which is a divisional of U.S. patent application Ser. No. 10/675,391, filed Sep. 30, 2003 (now U.S. Pat. No. 6,999,652), which claims priority to Japanese Patent Application Nos. 2002-323044 filed Nov. 6, 2002 and 2002-341334 filed Nov. 25, 2002. Each of these references is incorporated herein by reference.

BACKGROUND OF THE INVENTION

1. The Field of the Invention

The present invention relates to a 1×N optical switch, an integrated optical switch including optical waveguide switches coupled in a multi-stage. The present invention further relates to an optical module that electrically controls its output characteristics and is applicable to an optical communication system, to an optical switch and an optical matrix switch constituting the optical module.

2. The Relevant Technology

To cope with a sharp increase in traffic volume in data communication networks typified by the Internet recently, a large increase in capacity is being carried out by using optical transmission technology such as wavelength division multiplexing (WDM) transmission. Recently, the optical transmission technology is only applied to point-to-point optical links interconnecting nodes, but not applied to the processing within each node which is still carried out electrically. As the large transmission capacity more increases, the electrical processing poses problems of a slow increase in throughput and a sharp increase in cost. An optical cross-connect system and optical add drop system using optical switches can implement cut-through process by handling almost all the optical signals within a node optically, thereby being able to dramatically increase the throughput with reducing the cost. Thus, the optical switch is an essential device for constructing a large capacity, flexible communication network at a lower cost.

The optical switches are implemented in various types. Above all, optical waveguide switches are excellent in mass productivity and miniaturization. Conventionally, optical waveguides have been fabricated from a variety of materials. For example, silica-based optical waveguides formed on silicon substrates are characterized by a low loss, high stability and good matching with optical fibers. In addition, many different varieties of optical components typified by arrayed waveguide grating (AWG) multiplexer/demultiplexers are actually used.

A 1×N optical switch, one of the integrated optical switches, is an optical switch enabling one input port to be connected to any one of output ports. For example, in a selecting switch for a monitoring device, a selecting switch from light sources, or an optical cross-connect system, it is applicable to important optical switches such as an N×N optical matrix switch consisting of a combination of a plurality of 1×N optical switches. As for silica-based waveguides, a 1×N optical switch has been implemented in a 1×128 scale.

FIG. 1 shows an arrangement of a conventional tree type 1×8 optical switch. It is implemented by connecting two 2×2 optical switch units to outputs of a 2×2 optical switch unit connected to an optical input port, and successively cascading 2×2 optical switch units in a 3-stage constitution. The 2×2 optical switch unit at an a-stage, b-row position is represented by a-b (e.g., 3-2). The third stage 2×2 optical switch units have their output waveguides connected to optical output ports via gate optical switches. The c-th gate optical switch from the top is denoted by G-c (e.g., G-3). Each 2×2 optical switch unit can connect selectively one of the two inputs to any one of the two output waveguides. Thus connecting the 2×2 optical switch units in cascade with multi-stage enables the whole to function as a 1×N optical switch. The gate optical switches connected to the optical output ports improve the extinction ratio by carrying out ON/OFF operation.

FIG. 2 shows an arrangement of a conventional tap type 1×8 optical switch. A 2×2 optical switch unit connected to an optical input port has its first output waveguide connected to an input waveguide of the next-stage 2×2 optical switch unit, and its second output waveguide connected to an input waveguide of a gate optical switch connected to an optical output port. Thus, eight 2×2 optical switch units are connected in an 8-stage constitution. Although FIG. 1 shows an example of the tree type arrangement, a combination of the tree type construction and tap type construction is also possible. The tree type construction is superior in reduction in size and loss of the switch circuit. On the other hand, the tap type construction is superior in lower consumption of the switch circuit. For example, arrangements of the optical switches making use of these features of each type are disclosed in T. Goh, et al., "Large-scale integrated silica-base thermo-optic switches", NTT Review, Vol. 13, No. 5, pp. 18-25, 2001.

FIGS. 3A-3C shows an arrangement of a conventional 2×2 optical switch unit. FIG. 3A is a plan view of a 2×2 optical switch unit 1100 built on silica-based waveguides. FIG. 3B is a cross-sectional view taken along the line A-A' of FIG. 3A, and FIG. 3C is a cross-sectional view taken along the line B-B' of FIG. 3A. The 2×2 optical switch unit 1100 is a Mach-Zehnder interferometer (called "MZI" from now on) type 2×2 optical switch including two arm waveguides $1103a$ and $1103b$. The two arm waveguides include a thermooptic phase shifter utilizing thin-film heaters $1101a$ and $1101b$, and have their both ends connected with 3 dB couplers $1102a$ and $1102b$.

An MZI type 2×2 optical switch having two arm waveguides $1103a$ and $1103b$ of an equal length is called a symmetric type MZI. In contrast, an MZI type 2×2 optical switch having two arm waveguides $1103a$ and $1103b$ with an optical path difference of half wavelength is called an asymmetric type MZI. According to a known interference principle, the symmetric type MZI propagates light along the crossed path (port 1A port→2B) when the thermooptic phase shifter is not driven, and along the bar path (port 1A port→2A) when the thermooptic phase shifter is driven because of the optical path difference of half wavelength caused by the thermooptic effect.

In addition, the optical path is continuously shifted from the crossed path to the bar path by continuously varying the optical path difference between the two arm waveguides from zero to a half wavelength by controlling the driving current supplied to the thin-film heaters $1101a$ and $1101b$. In other words, the MZI type 2×2 optical switch operates not only as an ON/OFF switch, but also as a continuously adjustable analog switch between transmission and interruption of light. Accordingly, the MZI type 2×2 optical switch can be used as an attenuator or an optical branching circuit for carrying out multicast or broadcast by adjusting a distribution ratio between the crossed path and the bar path.

The gate optical switches as shown in FIGS. 1 and 2 use asymmetric type MZIs. The asymmetric type MZIs propagate light along the bar path (port 1A port→2A) when the thermooptic phase shifter is not driven, but along the crossed path (port 1A port→2B) when the thermooptic phase shifter is driven because the optical path difference of half wavelength is canceled out by the thermooptic effect. Thus, as for the gate optical switches, using the asymmetric type MZI makes it possible to economize the power consumption, and to take full advantage of the cross port with a higher extinction ratio.

Thermooptic switches using the silica-based waveguides are fabricated by combining a glass film deposition technique such as flame hydrolysis deposition (FHD) or chemical vapor deposition (CVD), with a micro etching technique such as a reactive ion etching method (RIE). More specifically, a glass film of an under cladding layer is formed on a substrate such as a silicon wafer, followed by depositing a core layer with a refractive index slightly higher than that of the cladding layer. Subsequently, a core pattern is formed by a micro etching technique, followed by depositing a glass film to be shaped to an over cladding layer. Finally, thin-film heaters of the thermooptic phase shifters and wiring for supplying power to them are formed, thereby fabricating an optical switch chip. The optical switch module is completed by connecting power supply lines and optical fibers to the optical switch chip, and by packing it into a case with a radiator fin.

A 1×128 optical switch fabricated by using the tree type arrangement as shown in FIG. 1 and the 2×2 optical switch units as shown in FIGS. 3A-3C can achieve superior characteristics with the average insertion loss of 3.7 dB and average ON/OFF extinction ratio of 50.8 dB (For example, refer to T. Watanabe et al., "Silica-based PLC 1×128 thermo-optic switch", Proc. 27th ECOC'01, Tu.L. 1.2, Amsterdam, 2001).

The conventional 1×N optical switch module, however, has a problem of requiring an enormous number of driving circuits of the thermooptic phase shifters, that is, the driving current supply circuits for the thin-film heaters. FIG. 4 shows the driving current supply circuits of the conventional tree type 1×8 optical switch. To control the individual 2×2 optical switch units, the power supply lines 11-14 of the driving current supply circuits, which connects to the 2×2 optical switch units individually, are connected to analog adjustable driving power supply circuits (not shown in FIG. 4), and the driving current supply circuits are connected to control lines. The power is supplied to one of the two thin-film heaters. The control lines are not shown in FIG. 4 to simplify the drawing.

As for the 1×N optical switch, the number of the driving power supply circuits required for the tree type construction is given by the following expression.

$$2^{(log_2 N+1)}-1$$

In contrast, the tap type construction requires 2N driving power supply circuits. Accordingly, as for the 1×128 optical switch, the tree type construction requires as many as 255 driving power supply circuits, and the tap type construction requires 256 driving power supply circuits.

So far, the problem is described in that the number of the driving power supply circuits is great.

Next, a problem will be described in that the area of the electrical wiring region in the PLC substrate is increasing for the above reason, and that the number of wires between the PLC substrate and driving IC assembly substrate is large.

FIG. 5 shows a conventional example of the optical switch module. The upper half of FIG. 5 shows a substrate of a 1×128 optical switch 501 using a thermooptic effect of a silica-based planar lightwave circuit (PLC), and the lower half of FIG. 5 shows an electrical wiring substrate 521 on which ICs (integrated circuits) 525 for driving the optical switch are mounted. They together constitute the 1×128 optical switch module.

As for the PLC substrate, a plurality of 1×2 optical switches 503, each of which consists of a 2-input 2-output optical switch unit, are connected in a 7-stage tree, thereby configuring a 1×128 optical matrix switch on the same substrate as shown in FIG. 5, (see T. Watanabe et. al., "Silica-based PLC 1×128 thermo-optic switch", Proc. 27th ECOC'01, Tu.L.1, 2, Amsterdam, 2001).

Each 1×2 optical switch 503 of FIG. 5 uses the Mach-Zehnder interferometer type 2×2 optical switch (MZI optical switch) as described above in connection with FIGS. 3A-3C.

Arranging the basic optical switches as shown in FIGS. 3A-3C in a tree construction as shown in FIG. 5 can implement the 1×128 optical switch 501. The eighth stage of FIG. 5 is added to improve the extinction ratio by gate optical switches 505.

Each gate optical switch 505 consists of the asymmetric type MZI optical switch as described above.

FIG. 6 shows an arrangement of electrical driving circuits for heaters 1101a and 1101b shown in FIGS. 3A and 3C. As shown in FIG. 6, the heaters on one-side arms of the MZIs of the 1×2 optical switches 503 and 503 are connected to the driving analog power supply circuits 31 and 32 which are adjusted such that they each supply an optimum voltage (current) for driving the MZIs. On the opposite ends of the heaters, electrical digital switches 41 and 42 are connected which are brought into conduction or out of conduction so as to turn on or off the optical switches 503 and 503. Since the total of 255 1×2 optical switches is present, there are 255 driving power supply circuits and 255 electrical digital switches as well.

An actually fabricated 1×128 optical switch can achieve excellent characteristics of the average insertion loss of 0.4 dB, and the average on/off extinction ratio of 40 dB.

Although the foregoing description is made by way of example of an optical switch, a variable optical attenuator can be constructed in the same manner by using the same MZI optical switches and by varying the variation of the phase in an analog fashion. For example, the variable optical attenuator is actually fabricated using the PLC. The variable optical attenuator is an essential device for equalizing the light intensity of the individual wavelengths of the signal light passing through the wavelength division multiplexing, and its demand has been increasing recently.

Other optical circuits growing in demand such as a dispersion compensator, polarization mode dispersion compensator and gain equalizer can also be implemented by using the MZI optical switches and by combining phase shifters and/or optical waveguides.

However, the foregoing 1×128 PLC thermooptic switch (PLC-TOSW) as shown in FIG. 5 has the following problems.

(1) The area of the electrical wiring region in the PLC substrate is large scale and apt to increase.

(2) It requires a great number of analog power supply circuits for driving, such as 255 power supply circuits in the foregoing example.

(3) The number of wire bondings between the PLC substrate and driving IC assembly substrate is increasing. The example of FIG. 5 requires 255 electrode pads 511 and 515, and 255 wiring electrode pads for connecting to the upper driving circuits, thereby requiring the total of 510 electrode pads.

(4) The inspection process requires a probe with a considerable number of pins, which in turn requires high precision probe aligning equipment.

The foregoing problems will be described in more detail one by one.

(1) There are 255 thermooptic phase shifters (heaters) to be driven on the substrate of FIG. 5, and their both ends are connected to the wiring electrode pads 511 for electrical wires at the edge of the substrate via the gold electrical circuits 507 and 509. Thus, it is necessary to layout as many as 255 gold electrical circuits 507 and 509 on the substrate without an intersection. Accordingly, the area of the electrical wiring sharply increases with the large scale of the optical circuit and the multichannels.

Next, the area of the electrical wiring will be estimated quantitatively. As for gold electrical circuits for driving the Ta2N film heaters, considering that they are patterned on the optical waveguide substrate with a bend or warp, it is preferable that they consist of electric wiring in a single layer of the a gold thin film. In addition, considering the amount of the current required for driving the heaters, it is preferable that their width is about 50 □m, and the each gap between the wires is about 50 μm. Estimating the area necessary to develop the electrical wiring under the conditions, the 510 wires require the wiring width of 51.2 mm. Since the size of the substrate is 60 mm×60 mm in the example of FIG. 5, and the average wiring length is estimated to be 4 cm when the wiring is pulled to the edge of the substrate, the area of the electrical wiring region from the heaters to the digital switches is estimated to be 20 cm². On the other hand, the area of the optical circuit itself is reduced to 20 mm×60 mm=12 cm² by using the core with a small permissible bending radius suitable for miniaturization and the cladding with a relative refractive index difference of 1.5%. Since the crossing layout of the optical circuit with the electrical wiring itself is possible, it can be said that the miniaturization of the PLC optical switch substrate is limited by the area of the electrical wiring region.

(2) The example of the 1×128 PLC thermooptic switch as shown in FIG. 5 has on the substrate the 255 thermooptic phase shifters (heaters) to be driven. Accordingly, it also requires as many as 255 driving (power supply) circuits.

(3) In the foregoing (1), the 510 wires on the PLC substrate must be connected one by one to the driving circuits 525 assembled on another substrate. The connection between the substrates is usually performed by wire bonding. Assume that the wire bonding electrodes 511 and 515 are 150 μm wide and the gap is 50 μm, then the pitch becomes 200 μm. Thus, the 510 wire bondings become as much as 104 mm wide.

Here, the following methods are taken to fix the PLC substrate on the electronic circuit assembly substrate: a method of pasting the PLC substrate to a larger substrate including the electronic circuit; or a method of placing the PLC substrate and electronic circuit substrate on a third substrate. Employing either method, which carries out the wire bonding at 200 degree Celsius, for example, can bring about the difference in the contraction because of the thermal expansion coefficient difference between each substrates, which can cause the stress to be imposed on wires 513, which can reduce the reliability.

(4) Furthermore, in the process of actually fabricating the module, an inspection process is essential which evaluates the optical characteristics and electrical characteristics by bringing an electrical probe into contact with the electrode pads from the outside and by driving the heaters of the PLC substrate. To conduct the evaluation, it is necessary for the conventional example to bring the 510 electrode pads into contact with the electrical probe simultaneously, which requires a special and expensive electrical probe, and aligning equipment that enables the electrical probe to make contact with the electrode pads on the PLC substrate in parallel at high precision.

Thus far, problems of the optical module are described which electrically connects the driving electrical circuit with the optical circuit by way of example of the 1×128 optical switch. These problems occur because the optical circuit and electrical circuit, which increase their size and the multichannel or multiport recently, are not optimized in their entirety. For example, as for the example described above, the problems result from the fact that the electrical circuit is not optimized even though many heaters, which are present on the optical waveguide substrate to be driven by the electrical circuit, are placed in distributed locations because of typical circumstances of the optical circuit. Similar conditions apply to optical circuits than the 1×N optical switch, thereby constituting common problems to optical modules that electrically control the output characteristics. For example, similar problems can occur in an N×N matrix optical switch, a variable optical attenuator and its arrayed module, a dispersion compensator, a gain equalizer.

SUMMARY OF THE INVENTION

The present invention is implemented to solve the foregoing problems. Therefore a first object of the present invention is to provide a 1×N optical switch capable of reducing the number of driving power supply circuits without impairing the function of the switch.

A second object of the present invention is to provide an optical module that electrically connects a driving electrical circuit with an optical waveguide circuit, that is capable of miniaturizing an optical waveguide substrate and sharply reducing the number of gold wires which are likely to impair the reliability, by reducing the area of the electrical wiring region on the substrate, by reducing the number of the connection wires from the PLC substrate to the outside, and by reducing the number of analog driving circuits, and father that is capable of simplifying the characteristic evaluation by eliminating an IC assembly substrate for driving the optical switches or the optical variable attenuators, by reducing the module size, and by reducing the number of electrode terminals of the probe.

To accomplish the first object, according to one aspect of the present invention, there is provided a 1×N optical switch comprising: a two-port optical switch connected to an input waveguide, and capable of continuously adjusting its optical output intensity from a first output to a second output; a switch section including one or more two-port optical switches connected in cascade to the output(s) of the two-port optical switch, and having its outputs connected to N output waveguides, where N is an integer equal to or greater than three; a plurality of gate optical switches, each of which is connected to one of the output waveguides and capable of continuously adjusting its optical output from transmission to interruption; a plurality of switch driving power supply circuits for driving the two-port optical switches, the two-port optical switches being divided into groups, each of which includes only one two-port optical switch that is brought into conduction at a time, and the two-port optical switches in a same group sharing one of the switch driving power supply circuits; a gate driving power supply circuit for driving the gate optical switches, all the gate optical switches sharing the gate driving power supply circuit; and electrical digital switches, each of which is connected to one of the two-port optical switches or the gate optical switches for interrupting a driving current from one of the driving power supply circuits.

To accomplish the first object, according to another aspect of the present invention, there is provided a 1×N optical switch comprising: a two-port optical switch connected to an input waveguide, and capable of continuously adjusting its optical output intensity from a first output to a second output; a switch section including one or more two-port optical switches connected in cascade to the output(s) of the two-port optical switch, and having its outputs connected to N output waveguides, where N is an integer equal to or greater than three; a plurality of gate optical switches, each of which is connected to one of the output waveguides and capable of continuously adjusting its optical output from transmission to interruption; a switch driving power supply circuit for driving the two-port optical switches, all the two-port optical switches sharing the switch driving power supply circuit; a gate driving power supply circuit for driving the gate optical switches, all the gate optical switches sharing the gate driving power supply circuit; and electrical digital switches, each of which is connected to one of the two-port optical switches or the gate optical switches for interrupting a driving current from one of the driving power supply circuits.

Preferably, power supply lines can be shared which connect the two-port optical switches to the switch driving power supply circuits shared, and power supply lines can be shared which connect the gate optical switches to the gate driving power supply circuit shared.

To accomplish the first object, according to another aspect of the present invention, there is provided a 1×N optical switch comprising: a two-port optical switch connected to an input waveguide, and capable of continuously adjusting its optical output intensity from a first output to a second output; a switch section including one or more two-port optical switches connected in cascade to the output(s) of the two-port optical switch, and having its outputs connected to N output waveguides, where N is an integer equal to or greater than three; a plurality of gate optical switches, each of which is connected to one of the output waveguides and capable of continuously adjusting its optical output from transmission to interruption; a driving power supply circuit for driving the two-port optical switches and the gate optical switches, all the two-port optical switches and gate optical switches sharing the driving power supply circuit; and electrical digital switches, each of which is connected to one of the two-port optical switches or the gate optical switches for interrupting a driving current from one of the driving power supply circuits.

Preferably, power supply lines can be shared which connect the two-port optical switches and the gate optical switch to the driving power supply circuit shared. The power supply lines can be shared on an optical switch chip in which the switch section, the plurality of gate optical switches and the power supply lines are integrated. Each of the two-port optical switches can have its first output connected to one of the output waveguides and its second output unconnected or connected to an input of one of other two-port optical switches to make the switch section a tap type arrangement. The two-port optical switches or the gate optical switches can be each composed of a 2×2 optical switch having one of its input/output ports unconnected. The two-port optical switches or the gate optical switches can each consist of an optical switch using silica-based optical waveguides.

In the 1×N optical switch in accordance with the present invention, the two-port optical switches share driving power supply circuits for driving them. Thus, it can reduce the number of the driving power supply circuits without impairing its functions such as a unicast operation, thereby being able to miniaturize the optical switch.

In addition, the 1×N optical switch in accordance with the present invention can reduce the size of the optical switch chip, electrical circuit substrate or optical switch module, and reduce the number of the electrical connection terminals.

To accomplish the second object, according to one aspect of the present invention, there is provided an optical module comprising: an optical waveguide circuit; and a driving electronic circuit for providing the optical waveguide circuit with a refractive index variation to modify an output characteristic, wherein the driving electronic circuit is mounted on a substrate of the optical waveguide circuit together with the optical waveguide circuit.

Preferably, the driving electronic circuit can be mounted on the substrate of the optical waveguide circuit in the form of a bare chip. Wiring from the driving electronic circuit can be grouped and integrated on the substrate of the optical waveguide circuit. The optical waveguide circuit can consist of an optical switch. The optical waveguide circuit can consist of a variable optical attenuator. The optical waveguide circuit can consist of a silica-based optical waveguide circuit.

Preferably, the optical waveguide circuit consists of a 1×N optical switch with one input and N outputs, where N is an integer equal to or greater than three, wherein the 1×N optical switch comprises: one input waveguide placed on the substrate of the optical waveguide circuit; N output waveguides placed on the substrate of the optical waveguide circuit; N gate optical switches, each of which is connected to one of the N output waveguides on the substrate of the optical waveguide circuit, for controlling passing of light; and a plurality of 1×2 optical switches placed between the input waveguide and the gate optical switches, for continuously switching its path in response to a level of an electrical signal from the driving power supply circuit in the driving electronic circuit, and wherein the plurality of 1×2 optical switches are divided into a plurality of groups, each of which is assigned one of the driving power supply circuits, and the optical module further comprises electrical digital switches incorporated into integrated circuits (ICs) for controlling levels of electrical signals supplied from the driving power supply circuits to the plurality of 1×2 optical switches.

Preferably, the optical waveguide circuit consists of an optical matrix switch for linking mth input waveguide to lth output waveguide with an M×L optical cross-point switch, where M and L are an integer equal to or greater than 2, and m and l satisfy relationships $1 \leq m \leq M$ and $1 \leq l \leq L$, respectively, wherein the optical matrix switch comprises: M input waveguides placed on the substrate of the optical waveguide circuit; L output waveguides placed on the substrate of the optical waveguide circuit; and an M×L optical cross-point switch placed between the M input waveguides and the L output input waveguides on the substrate of the optical waveguide circuit, and consisting of a duplex type optical switch including 1×2 optical switches and 2×1 optical switches, each of which continuously switching its path in response to the level of the electrical signal fed from the driving electronic circuit, and wherein the 1×2 optical switches and the 2×1 optical switches are divided into a plurality of groups, each of which is assigned one of driving power supply circuits in the driving electronic curcuits, and the optical module further comprises electrical digital switches incorporated into integrated circuits (ICs) for controlling levels of electrical signals supplied from the driving power supply circuits to the 1×2 optical switches and to the 2×1 optical switches.

According to the optical module in accordance with the present invention, it is possible in the optical circuit such as optical switch to reduce the size of the optical waveguide substrate by miniaturizing the electrical wiring region on the substrate by the sharing; to sharply reduce the number of the gold wires between the substrates, which are likely to degrade reliability, by mounting the driving or control IC on the optical waveguide substrate in the form of a bare chip; and the to miniaturize the module size by removing the IC assembly substrate for driving the optical switch or optical variable attenuator.

Furthermore, the optical module in accordance with the present invention can greatly reduce the number of the electrode terminals (electrode pads) of the probe used for evaluating the characteristics of the optical waveguide substrate in the inspection process of fabricating the optical circuit, thereby being able to simplify the evaluation work and to cut costs.

The above and other objects, effects, features and advantages of the present invention will become more apparent from the following description of embodiments thereof taken in conjunction with the accompanying drawings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 3A is a plan view, FIG. 3B is a cross-sectional view taken along the line A-A' of FIG. 3A, and FIG. 3C is a cross-sectional view taken along the line B-B' of FIG. 3A;

DETAILED DESCRIPTION OF THE PREFERRED EMBODIMENTS

The optical module and optical switch constituting the same according to the embodiments of the present invention will be described below with reference to the drawings.

First Embodiment

Figure 4:
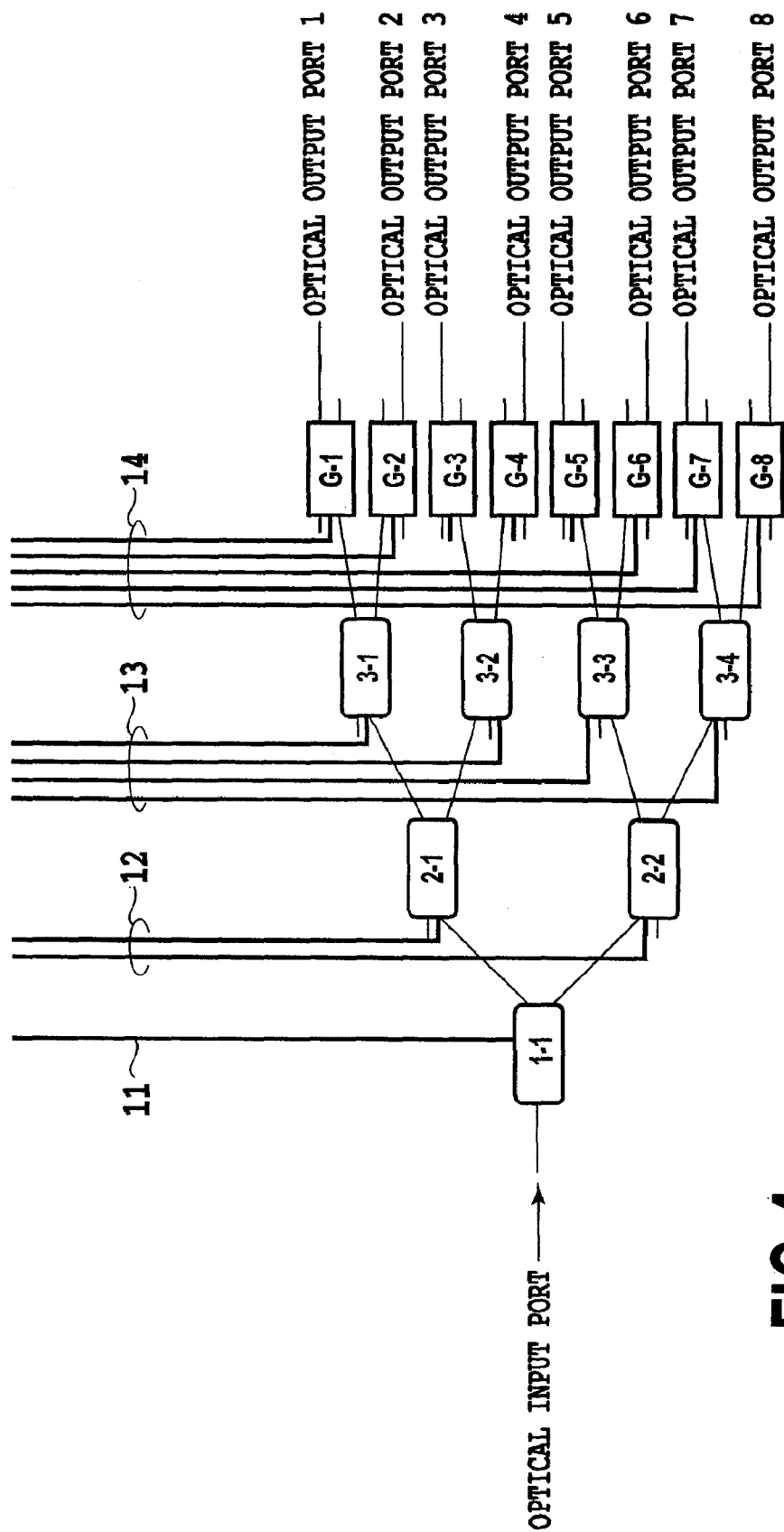
FIG. 4 is a schematic diagram showing a configuration of driving current supply circuits of a conventional tree type 1×8 optical switch.

A plurality of 2×2 optical switch units constituting a 1×N optical switch carry out ON/OFF switching under some constraints rather than independently of each other. If the maximum number of stages of a tree type 1×N optical switch is n ($1 \leq n \leq \log_2 N$), then a given mth stage from the input waveguide includes $2^{m-1}$ 2×2 optical switch units ($1 \leq m \leq n$). For example, the tree type 1×8 optical switch as shown in FIG. 4 includes four 2×2 optical switch units 3-1, -2, 3-3 and 3-4 in the third stage. In the case of an ordinary unicast, only one of the above four 2×2 optical switch units is brought into on-state, and only one of the N gate optical switches connected to the optical output ports is brought into on-state.

Thus, let us consider a case where the 2×2 optical switch units are divided into a plurality of groups, in each of which only one 2×2 optical switch unit is brought into on-state, such as each stage of the foregoing example, and where the 2×2 optical switch units in the same group share a single driving power supply circuit. In this case, the driving power supply circuit of each group can supply an optimum voltage to each optical switch unit in the group, without impairing the flexibility by sharing the driving power supply circuit. Although the complete sharing can reduce the number of the driving power supply circuits to a minimum, a partial sharing can offer an effect corresponding to the number reduced. As for the sharing of power supply lines, it can be implemented on a chip integrating 1×N optical switches, or on a module substrate on which control lines are integrated and the chip integrating 1×N optical switches are assembled.

Figure 7:
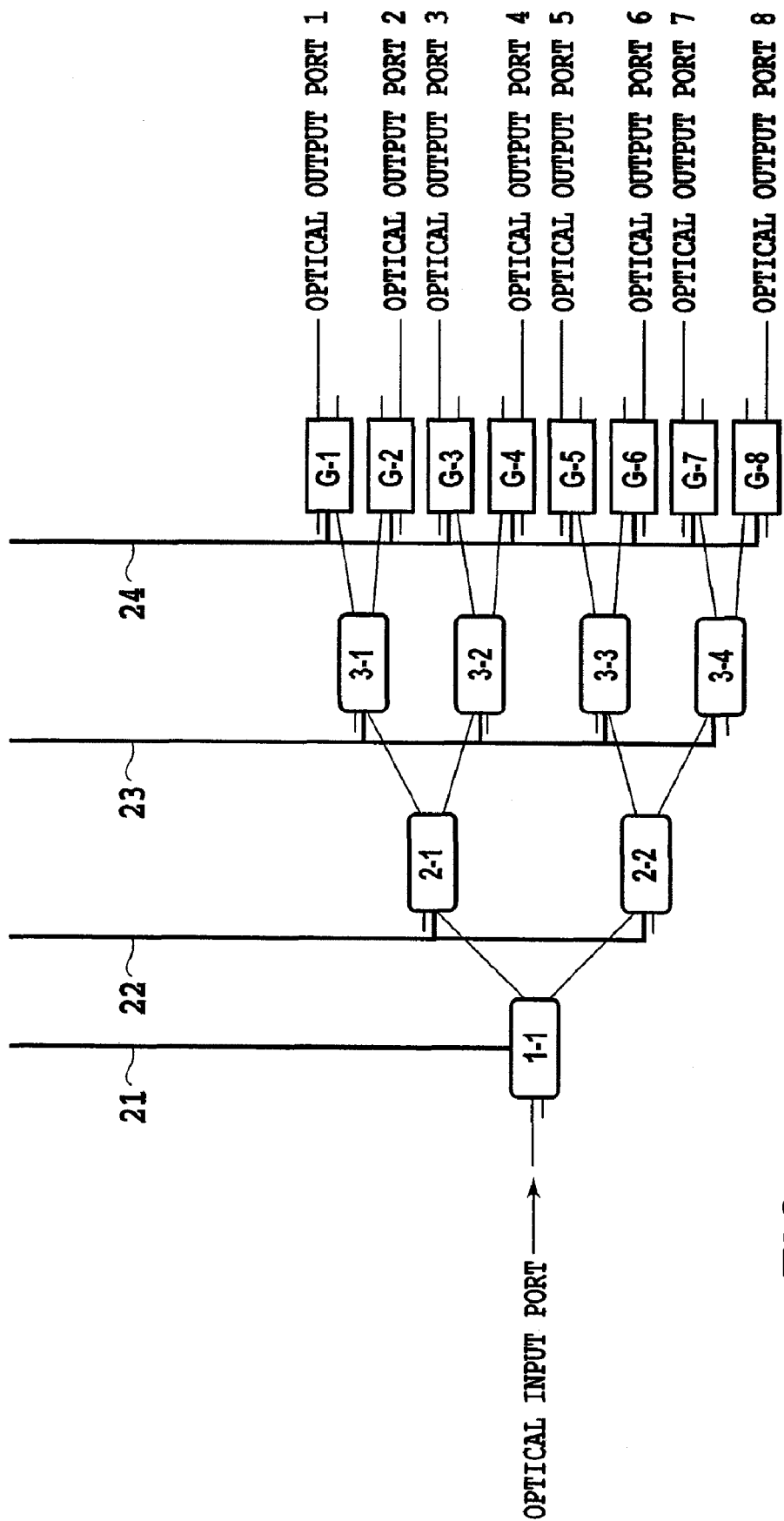
FIG. 7 is a schematic diagram showing a configuration of a first embodiment of a tree type 1×8 optical switch in accordance with the present invention.

FIG. 7 shows an arrangement of a first embodiment of a tree type 1×8 optical switch in accordance with the present invention. It is implemented by connecting two 2×2 optical switch units to a 2×2 optical switch unit connected to an optical input port, and successively cascading 2×2 optical switch units in a 3-stage constitution. The third stage 2×2 optical switch units have their output waveguides connected to predetermined optical output ports via correspondence gate optical switches respectively. The 2×2 optical switch units 1-1-3-4) each consist of a symmetric type MZI with a symmetric arm length shown in FIGS. 3A-3C. The gate optical switches (G-1-G-8) each consist of an asymmetric type MZI whose arm lengths differ from each other by a half wavelength. With this arrangement, the 1×8 optical switch can enlarge the extinction ratio when no current is supplied so that the effect of interrupting light from the other ports is improved. To control the individual 2×2 optical switch units, power supply lines 21-24 of the driving current supply circuits are connected to analog adjustable driving power supply circuits (not shown in FIG. 7), and the driving current supply circuits are connected to control lines. The power is supplied to one of the two thin-film heaters of the 2×2 optical switch unit. The control lines are not shown in FIG. 7 to simplify the drawing.

Figure 8:
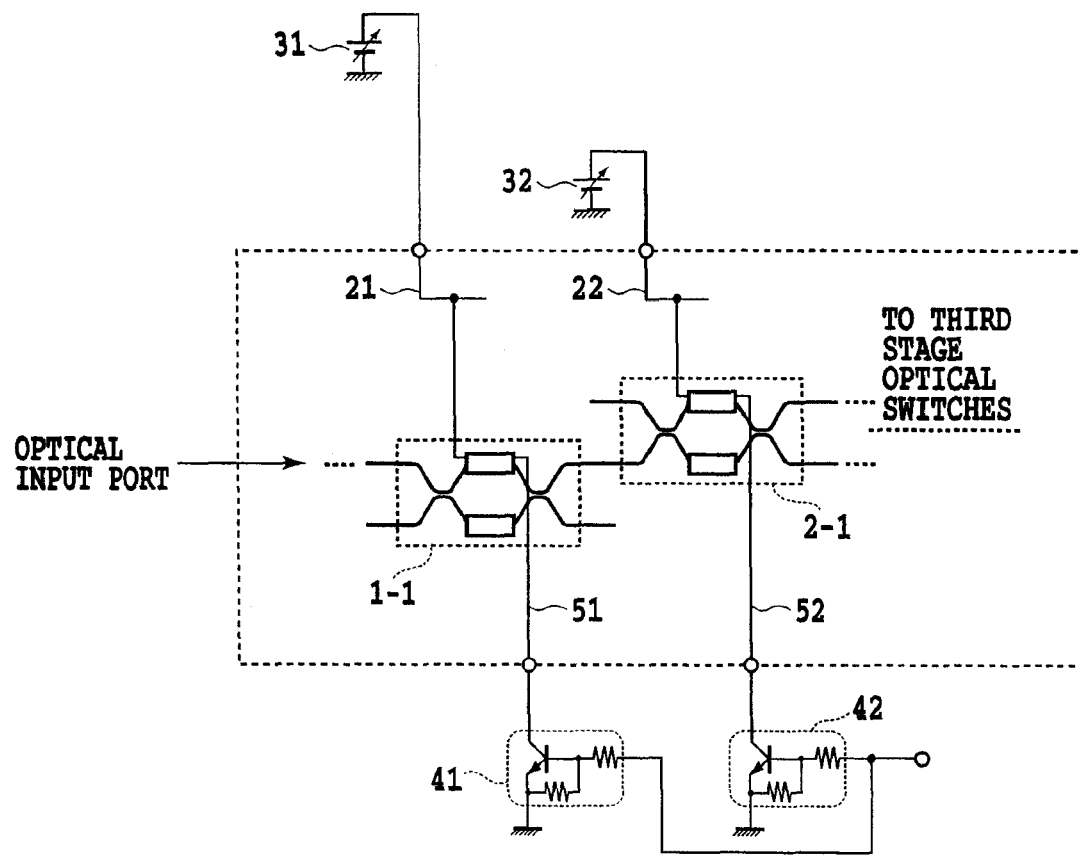
FIG. 8 is a circuit diagram showing driving current supply circuits of the first embodiment of the tree type 1×8 optical switch in accordance with the present invention.

FIG. 8 shows some driving current supply circuits of the first embodiment of the tree type 1×8 optical switch. It is an enlarged view showing the 2×2 optical switch units 1-1 and 2-1 of the tree type 1×8 optical switch as shown in FIG. 7. A first driving current supply circuit has its power supply line 21 connected to an analog adjustable driving power supply circuit 31, and its control line 51 connected to an electrical digital switch 41. Other driving current supply circuits are connected likewise. The electrical digital switches 41 and 42 are incorporated into an IC including many transistor circuits integrated therein, and brought into conduction/interruption by a TTL level input, thereby bringing the 2×2 optical switch units into on-state or out of off-state.

It greatly differs from the conventional arrangement in that it communizes the driving power supply circuits. For example, the four 2×2 optical switch units 3-1-3-4 in the third stage are connected in parallel to the power supply line 23 of the driving current supply circuit to share the third driving power supply circuit. Likewise, the two 2×2 optical switch units 2-1 and 2-2 in the second stage share the second driving power supply circuit and the eight gate optical switches G-1-G-8 share the fourth driving power supply circuit. Thus, the number of the driving power supply circuits can be reduced from 15 of the conventional module to four. In addition, since the power supply lines of the driving current supply circuits can be shared, the area of wiring can also be reduced, furthermore, electrical contact terminals connecting the optical switch chip with the driving power supply circuits can be reduced.

Here, a fabrication method of an optical switch chip using silica-based waveguides will be described. The optical switch chip associated with the first embodiment of the 1×8 optical switch is fabricated on a silicon substrate 1 mm thick using the known technology. The silica-based waveguides are formed by flame hydrolysis deposition technology using a hydrolysis reaction of gas sources such as $SiCl_4$ and $Cl_4$, and by reactive ion etching technology. The thin-film heaters for local heating are formed by vacuum evaporation and etching.

The wafer is diced and fixed to a ceramic substrate, followed by connecting single mode fibers to the optical input port and optical output ports. Each one of the thin-film heaters is connected to the driving power supply circuit and electrical digital switch via an electrical contact terminal, thereby forming the 1×8 optical switch module.

The 1×8 optical switch module also includes an electrical circuit substrate mounting a serial/parallel converter for a control signal. The serial/parallel converter converts control information input as a serial signal to TTL level parallel signals, and supplies its outputs to 15 electrical digital switches.

Thus, the number of the electrical contact terminals of the 1×8 optical switch module is about eight including about three serial control signal lines for controlling the serial/parallel converter, four power supply lines connected to the four driving power supply circuits and a ground wire. Thus, the present embodiment can also reduce the number of the electrical contact terminals. The reduction effect increases with the scale of the optical switch chip. For example, as for the 1×128 optical switch, the number of the parallel signal lines connected to the 255 optical switches are reduced from 255 to about 20. As for the electrical circuits such as the electrical digital switches, they can be integrated not only into the optical switch module, but also into an outside of the optical switch module. However, it is preferable that they are integrated into the optical switch module from the viewpoint of reducing the number of the electrical contact terminals and of miniaturizing the system by the integration.

Figure 9:
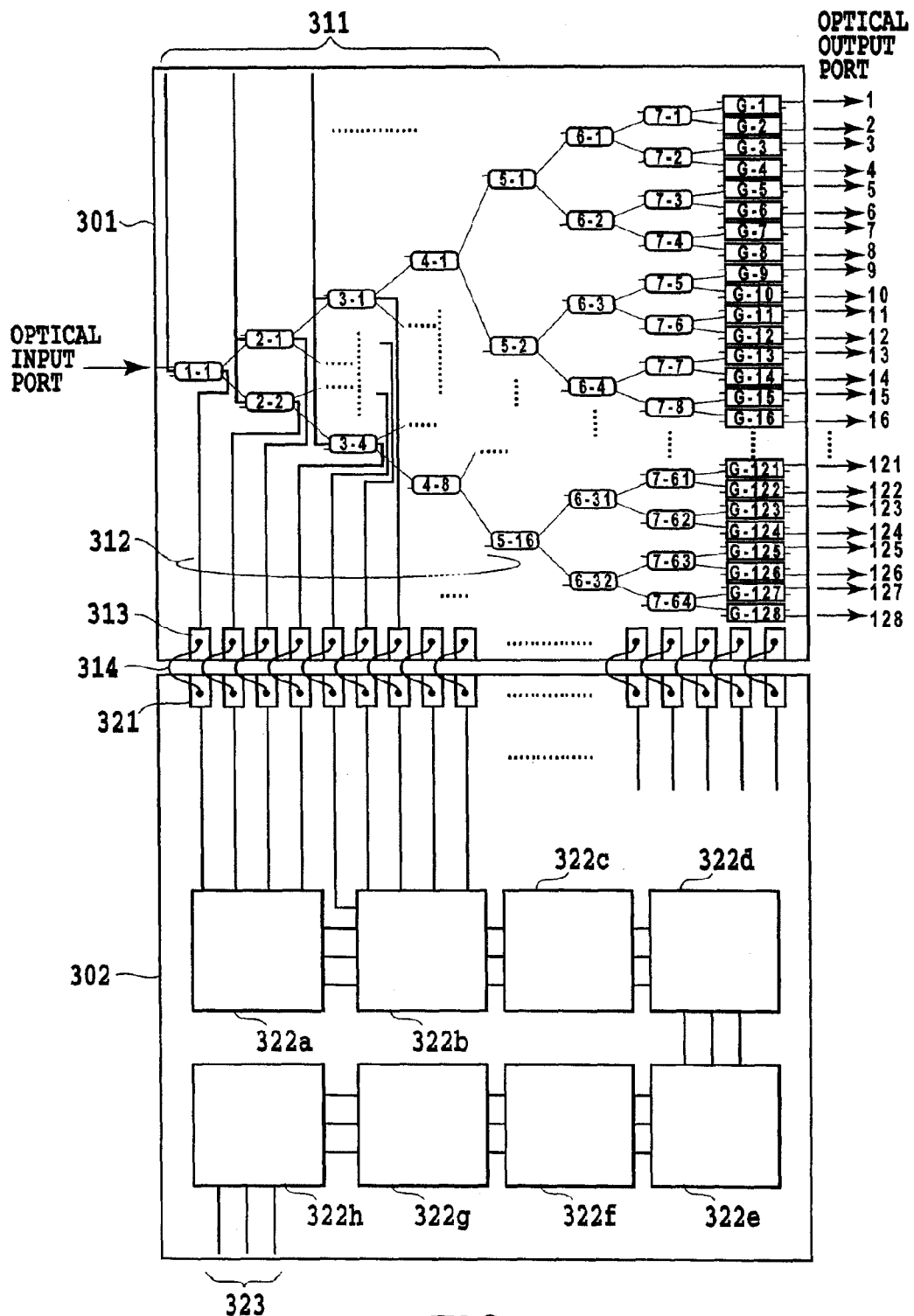
FIG. 9 is a schematic plan view showing an assembly of the first embodiment of the tree type 1×128 optical switch module in accordance with the present invention.

FIG. 9 shows an embodiment of the tree type 1×128 optical switch module in accordance with the present invention. The module composed of a 1×128 optical switch chip 301 and an electrical circuit substrate 302. The 1×128 optical switch chip 301 has on a Si substrate the 2×2 optical switch units using symmetric type MZIs, which are formed in a 7-stage tree fashion. The 2×2 optical switch units and the gate optical switches share the power supply lines 311 of the driving current supply circuits stage by stage, thereby sharply reducing the number of the power supply lines from 255 to eight, and the area of the substrate.

On the other hand, the control lines 312 of the driving current supply circuits are connected to ICs 322a-322h of the electrical digital switches mounted on the electrical circuit substrate 302 via electrode pads 313, gold wires 314 and electrode pads 321. The ICs 322a-322h are connected in series, and can be driven by signals such as a common clock signal, data signal and latch signal through control signal lines 323. For example, using a 1-MHz clock signal, they each latch a serial signal, which is assigned the control information about turning on and off of the individual thin-film heaters on a time base, at every time frame interval. Such time division multiplexed serial signal is converted by the serial/parallel converter into parallel signals to be supplied to the 255 electrical digital switches. Thus, all the thin-film heaters can be driven by the three control signal lines.

The 1×N optical switch thus fabricated can implement a variety of functions as follows.

(a) Unicast Operation

The output voltage of each driving power supply circuit is adjusted to an optimum operating voltage for the ON-state MZI type optical switch. The electrical digital switch connected to a desired one of the 2×2 optical switch units in each stage is brought into conduction (ON) via the serial control signal lines, with bringing the other electrical digital switches of the stage out of conduction (OFF). Thus, the light supplied to the optical input port can be output from desired one of the optical output ports. In addition, the extinction ratio can be improved by bringing the gate optical switch that outputs the light into conduction with the other gate optical switches being out of conduction. In this case, the insertion loss of the 1×28 optical switch is 3.7 dB, for example, and the extinction ratio thereof is 51 dB, which can satisfy the desired characteristics.

(b) Broadcast Operation

The 2×2 optical switch unit is an MZI type optical switch. Thus, using an intermediate potential between the optimum operation potentials for the conduction and interruption states of one of the outputs enables the two outputs to produce light at the same intensity. Placing all the 2×2 optical switch units at the same state and bringing all the gate optical switches into conduction enable all the output ports to bring out the optical input signal. This operation mode is called a broadcast operation. Such operation mode utilizes the feature that the optical switch is an MZI (Mach-Zehnder interferometer) type, and hence can vary the intensity ratio between the two outputs continuously. Almost all other optical switches such as MEMS (micro electromechanical system) optical switch cannot perform such operation.

(c) Applied Voltage Adjusting Function

As described above, in the unicast operation mode, only one 2×2 optical switch unit is brought into conduction (ON) in each stage by the corresponding 2×2 optical switch unit. Accordingly, even though all the 2×2 optical switch units in each stage share the corresponding driving power supply circuit, it is connected to only one 2×2 optical switch unit in the operation. Thus, the voltage can be adjusted independently which is to be applied to the 2×2 optical switch unit connected with the circuit to the electrical digital switch in the conduction (ON) state.

Utilizing the adjusting function of the applied voltage makes it possible to compensate for the individual variations in the optimum operating voltage resulting from fabrication errors of the 2×2 optical switch units. Usually, the fabricated 2×2 optical switch units have some variations in their optimum operating voltages because of the fabrication error. Driving the 2×2 optical switch units having variations in the optimum operating voltage at the same voltage can cause fluctuations in the insertion loss and extinction ratio, thereby degrading their characteristics. The degradation in the characteristics can be prevented by measuring the optimum applied voltages to the individual 2×2 optical switch units in advance and adjusting them individually.

(d) Equalizing Insertion Loss

The loss variations between the optical output ports of the 1×N optical switch can be equalized by adjusting the ON-state losses by utilizing the feature of the final stage gate optical switches that they can operate as variable optical attenuators capable of adjusting their output light from transmission to interruption continuously. As described above, the insertion losses of the optical paths in the 1×N optical switch can vary slightly because of such as the fabrication error of the 2×2 optical switch units even though the applied voltages to the 2×2 optical switch units are adjusted to the optimum operating voltages. The value of the variation is about 1 dB for a 1×8 optical switch. The loss differences between the optical output ports can be reduced by increasing the losses of the final stage gate switches with smaller losses such that they are adjusted to the maximum loss on the optical paths.

As for the two 3-dB couplers constituting the MZI type optical switch, directional couplers are used which are formed by placing two waveguides side by side in close proximity of a few micrometers. This is because the directional couplers have lower insertion loss than other devices. However, the 3-dB couplers are not limited to the arrangement. Other devices can be used such as multimode interferometer (MMI) couplers using multimode waveguides and wavelength independent couplers (WINCs) formed by cascading these couplers.

Second Embodiment

Figure 10:
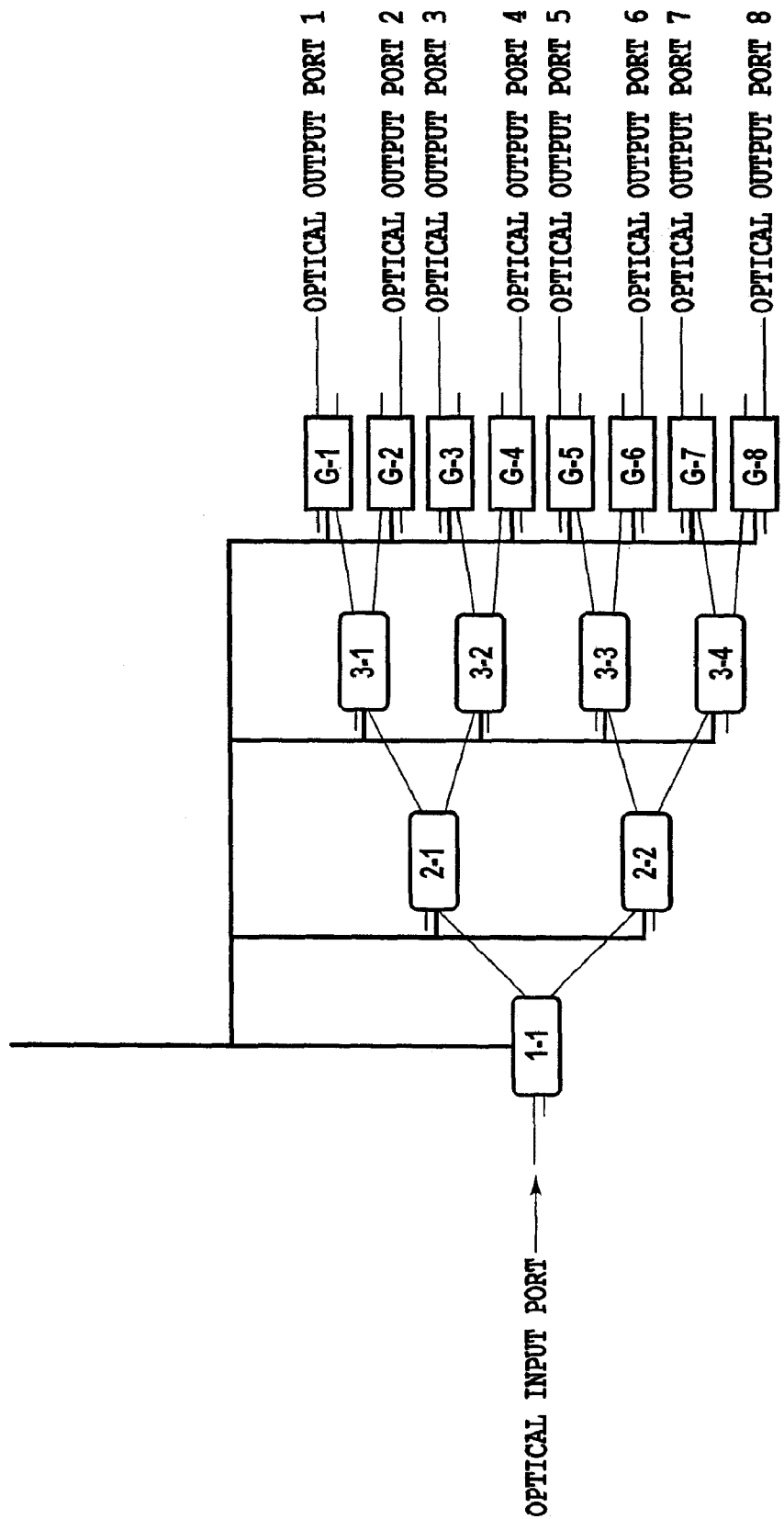
FIG. 10 is a schematic diagram showing a configuration of a second embodiment of the tree type 1×8 optical switch in accordance with the present invention.

FIG. 10 shows an arrangement of a second embodiment of the tree type 1×8 optical switch in accordance with the present invention. The second embodiment differs from the first embodiment in that the 2×2 optical switch units and gate optical switches of the second embodiment share only one driving power supply circuit. It can implement the foregoing (a) unicast operation and (b) broadcast operation, and can reduce the number of the driving power supply circuits from four to one. However, since the voltages applied to the 2×2 optical switch units and gate optical switches cannot be adjusted individually, the second embodiment does not have the foregoing (c) applied voltage adjusting function and (d) equalizing insertion loss, thereby bringing about slight characteristic degradation in the insertion loss and extinction ratio.

Third Embodiment

Figure 11:
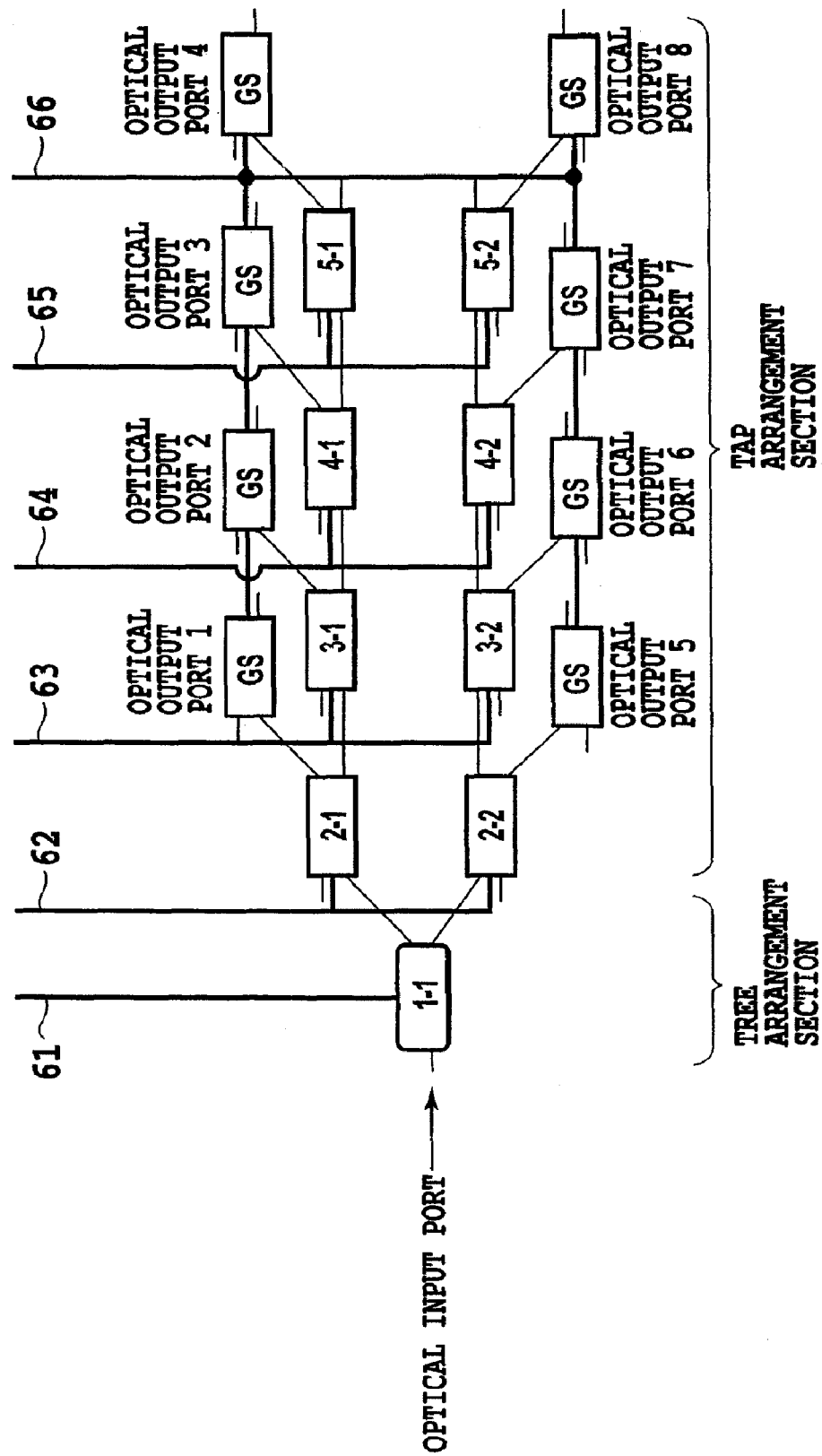
FIG. 11 is a block diagram showing a configuration of a third embodiment of a hybrid type 1×8 optical switch in accordance with the present invention.

FIG. 11 shows an arrangement of a third embodiment of a hybrid type 1×8 optical switch in accordance with the present invention. The third embodiment is a hybrid type combining a tree type construction and tap type construction. The 2×2 optical switch units at each stage share a driving power supply circuit, and all the gate optical switches share an another driving power supply circuit. Thus, the number of the driving power supply circuits is six, which is greater than that of the first embodiment, but is much less than that of the conventional example which is 15. As the first and second embodiments, the third embodiment can implement the foregoing (a) unicast operation and (b) broadcast operation. In addition, it can implement (c) applied voltage adjusting function and (d) equalizing insertion loss.

Although the foregoing description is made by way of some concrete examples, there are a variety of combinations of sharing the driving power supply circuits and combining the tree type and tap type arrangements. Table 1 shows some important examples. The number of the driving power supply circuits is given for the 1×8 optical switch by way of example.

TABLE 1

| Optical switch units | Shared in block | | Shared in block | | Shared in each stage | | Unshared | |
|---|---|---|---|---|---|---|---|---|
| Gate optical switches | | | Shared in block | | Shared in block | | Unshared | |
| Tree/tap | Tree | Tap | Tree | Tap | Tree | Tap | Tree | tap |
| Number of driving power supply circuits | 1 | 1 | 2 | 2 | 4 | 9 | 15 | 16 |

TABLE 1-continued

| | | | | | | | | |
|---|---|---|---|---|---|---|---|---|
| Function (a) | ○ | ○ | ○ | ○ | ○ | ○ | ○ | ○ |
| Function (b) | ○ | x | ○ | x | ○ | ○ | ○ | ○ |
| Function (c) | x | x | x | x | ○ | ○ | ○ | ○ |
| Function (d) | x | x | ○ | ○ | ○ | ○ | ○ | ○ |

(note)
Function (a): unicast operation
Function (b): broadcast operation
Function (c): applied voltage adjusting function
Function (d): equalizing insertion loss All the complete sharing in Table 1 can carry out the unicast operation. Since the conventional example in the rightmost column does not carry out the sharing of the driving power supply circuits, it requires the same number of the driving circuits as the 2×2 optical switch units. This means that 15 in tree type and 16 in tap type 2×2 optical switch units are required. In contrast with this, when the 2×2 optical switch units in the individual stages and the gate optical switches in block share the respective driving power supply circuits, the number of the driving power supply circuits in the tree type (first embodiment) and tap type constructions can be sharply reduced to four and nine, respectively. In addition, they can achieve the foregoing (c) applied voltage adjusting function and (d) equalizing insertion loss without fail.

Proceeding the sharing further offers a tradeoff between reducing the number of the driving power supply circuits and the loss of the functions of (c) and (d). However, the optimum arrangement can be chosen considering the characteristics and the number of the driving power supply circuits. Although Table 1 does not refer to the hybrid type of the tree type and tap type constructions, the hybrid type can be handled in the same manner because there is no difference between the tree type and tap type in the function of (c) and (d) on the category of the sharing.

Fourth Embodiment

Figure 12:
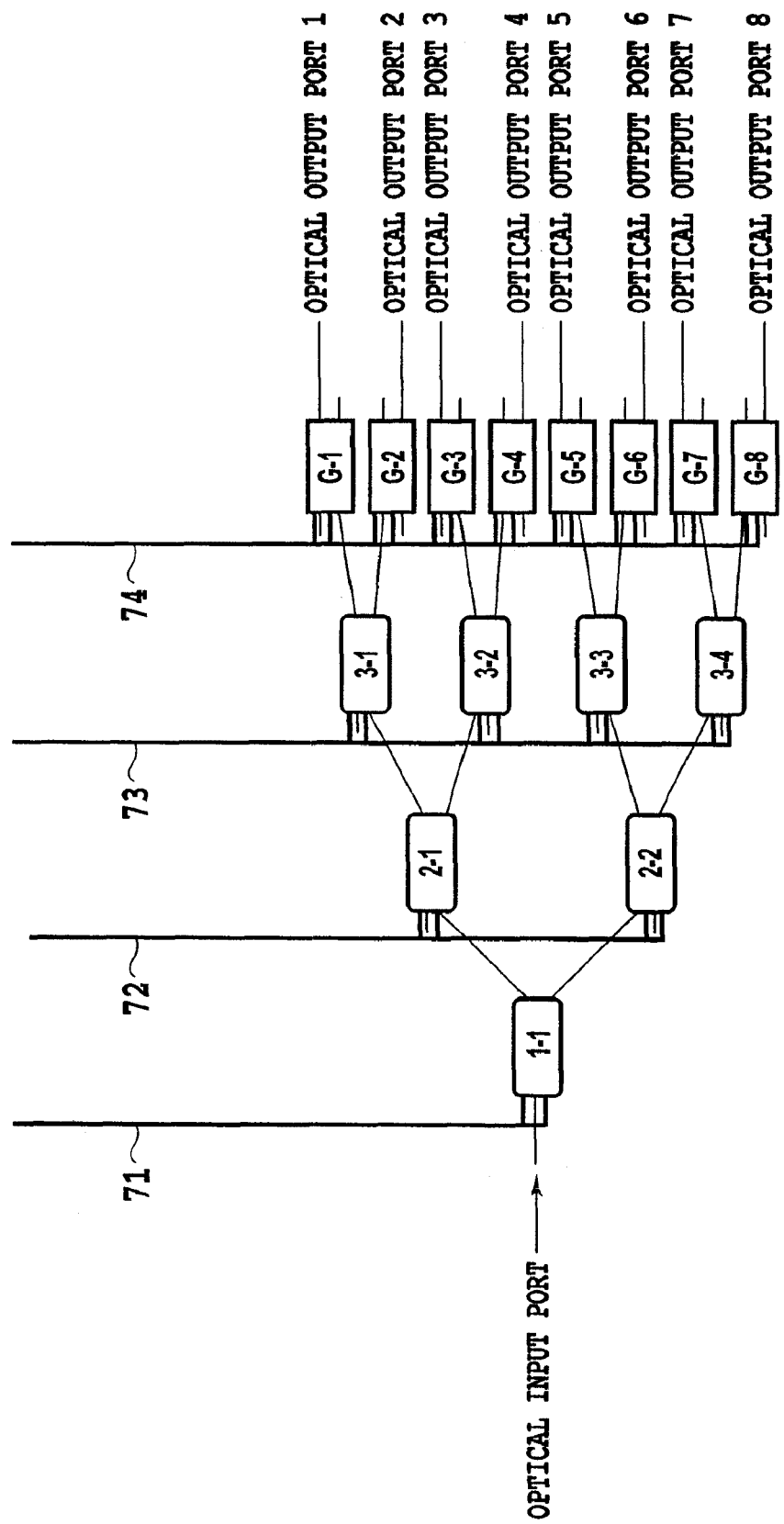
FIG. 12 is a schematic diagram showing a configuration of a fourth embodiment of the tree type 1×8 optical switch in accordance with the present invention.

FIG. 12 shows an arrangement of a fourth embodiment of the tree type 1×8 optical switch in accordance with the present invention. The first embodiment is configured such that it supplies power to only one of the two thin-film heaters of each 2×2 optical switch unit. In contrast with this, the fourth embodiment supplies power to the two thin-film heaters. The control of the individual 2×2 optical switch units is carried out by connecting the analog adjustable driving power supply circuits to first ends of the power supply lines 71-74, and control lines (not shown in FIG. 12) to second ends thereof.

Figure 13:
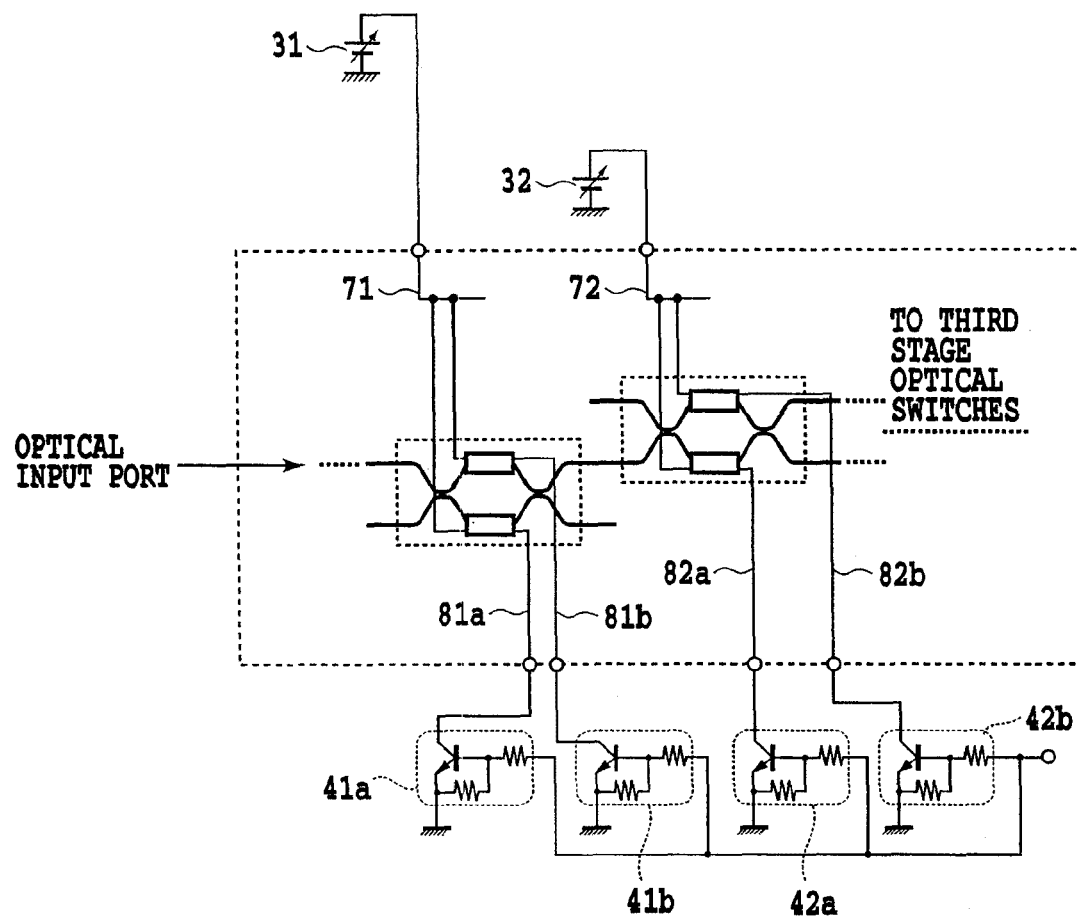
FIG. 13 is a circuit diagram showing driving current supply circuits of the fourth embodiment of the tree type 1×8 optical switch in accordance with the present invention.

FIG. 13 shows a configuration of the driving current supply circuits of the fourth embodiment of the tree type 1×8 optical switch. FIG. 13 is an enlarged view showing the 2×2 optical switch units 1-1 and 2-1 of the tree type 1×8 optical switch as shown in FIG. 12. The power supply line 71 of the driving current supply circuit has its first end connected to the two thin-film heaters and its second end connected to the analog adjustable driving power supply circuit 31. As in the first embodiment, the 2×2 optical switch units in each stage share one of the driving power supply circuits. A control line 81a of the driving current supply circuit is connected to the electrical digital switch 41a, and a control line 81b of the driving current supply circuit is connected to the electrical digital switch 41b to drive the thin-film heaters individually. The same configuration is applied to the other driving current supply circuits.

The configuration can expand the adjustment of the individually applied voltages in both the positive and negative directions in the foregoing (c) applied voltage adjusting function. The symmetric type MZI usually has the least crosstalk to the bar path when no voltage is applied to the thin-film heaters. However, the optimum point can be shifted by the fabrication error of the 2×2 optical switch unit and the like. The present embodiment can apply the optimum voltage at the minimum power consumption, even if the optimum point is shifted in either the positive or negative direction in the state without applying the voltage.

Providing heaters at both sides of the arm waveguides individually enables one of the thin-film heaters to serve as a spare heater. For example, even if one of the thin-film heaters of any one of the 2×2 optical switch units damages, the present embodiment can continue the optical switch operation successfully because the other thin-film heater can be driven independently. Thus, the present embodiment can sharply reduce the probability of the failure of the 1×N optical switch.

On the other hand, the number of the electrical digital switches is doubled, which offers a tradeoff of doubling the number of the driving current supply lines although they are short length, thereby increasing the area of the wiring section in the upper portion of the substrate. However, the present embodiment can minimize the increase in the area of the wiring section by sharing the driving power supply circuits and power supply lines together with adopting the ICs including the electrical digital switches.

Although the fourth embodiment is described by way of example that drives the thin-film heaters on both arms of the 2×2 optical switch units in the first embodiment, the same structure is applicable to other arrangements including the second to fourth embodiments. In addition, although the foregoing embodiments have the multi-stage arrangements of the 2×2 optical switch units, other multi-stage arrangements are possible using other two-branching optical switches such as 1×2 optical switches.

Fifth Embodiment

First, the common basic principle of the fifth to eighth embodiments of the optical module in accordance with the present invention will be described.

Figure 5:
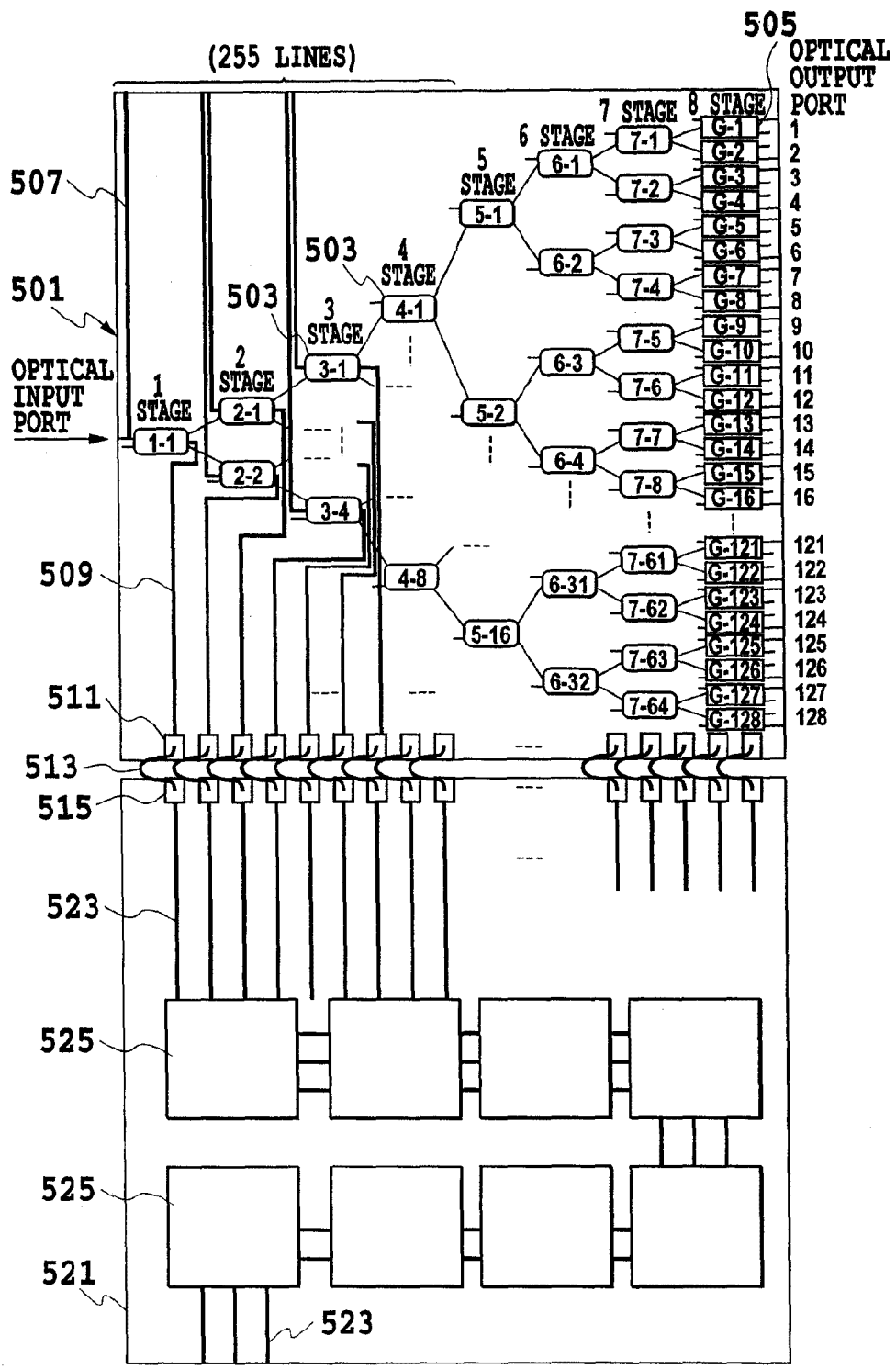
FIG. 5 is a schematic plan view showing a configuration of a conventional 1×128 PLC thermooptic switch.

The inventors of the present invention have found the following facts about the electrical circuits for driving the heaters as shown in FIG. 5. First, the optical switch units that are brought into conduction (on-state) in operation are subject to certain constraints rather than to a random scheme. Second, the driving power supply circuits can be combined and shared without or nearly without losing the flexibility by organizing the constraints.

The facts will be described by way of example of the driving power supplies shared in the tree type 1×N optical switch. As described before, assume that the 1×N optical switch is composed of the 1×2 optical switch units which are used as a basic optical switch unit individually and arranged in an n-stage tree fashion. In this case, only one optical switch unit is brought into conduction (current driving state) in a given stage a ($1 \leq \alpha \leq n$), such as one of the four optical switch units 3-1, 3-2, 3-3 and 3-4 in the third stage. In addition, only one of the N gate optical switches on the output waveguides is brought into conduction (current driving state).

Figure 1:
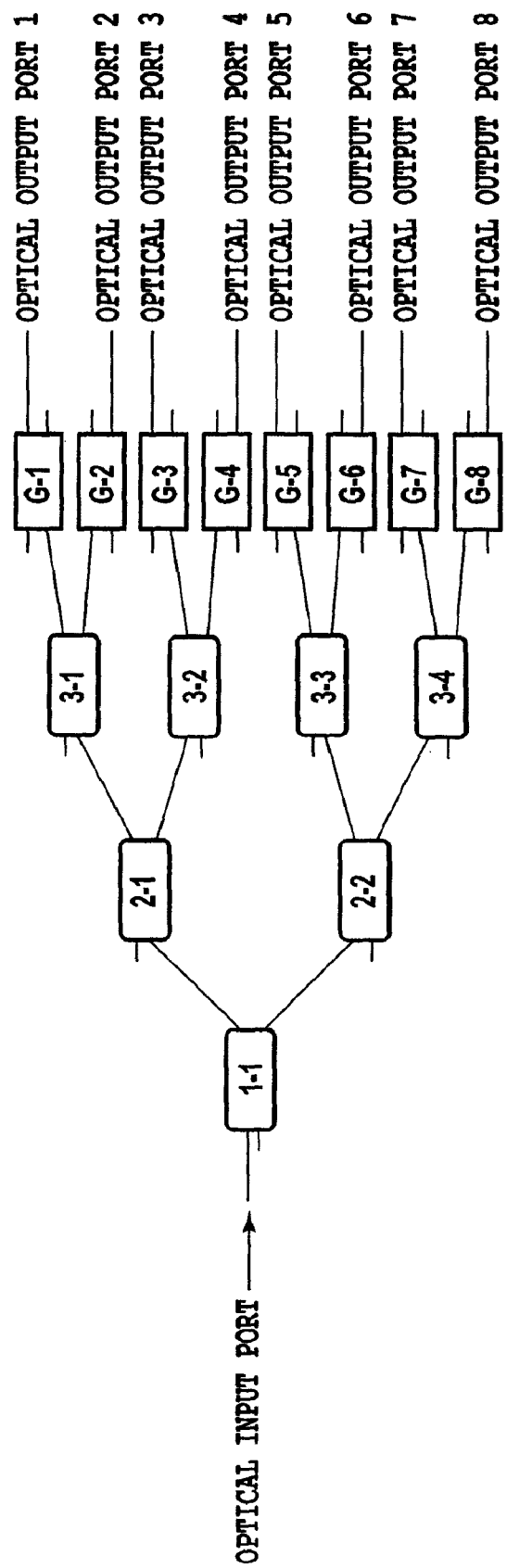
FIG. 1 is a schematic diagram showing a configuration of a conventional tree type 1×8 optical switch.
Figure 2:
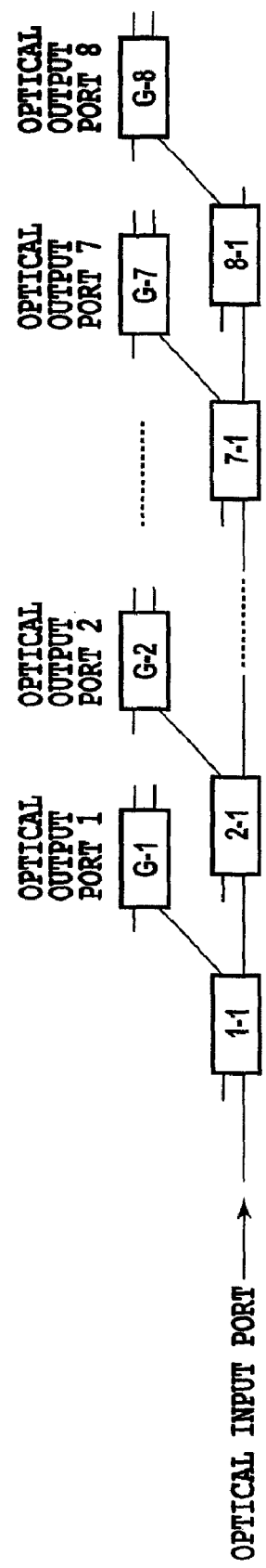
FIG. 2 is a schematic diagram showing a configuration of a conventional tap type 1×8 optical switch.
Figure 3A:
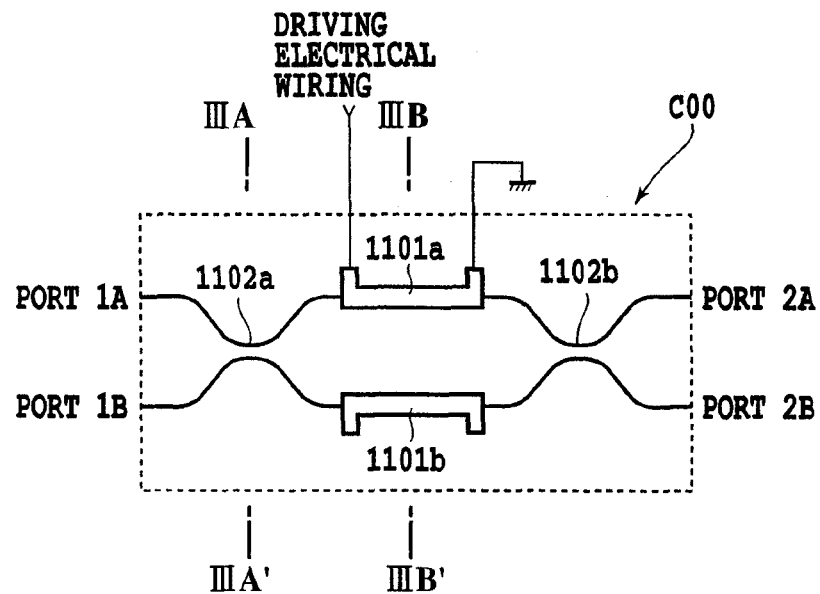
FIGS. 3A-3C are views showing a conventional 2×2 optical switch unit.
Figure 3B:
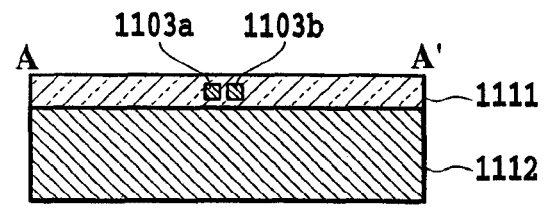
Figure 3C:
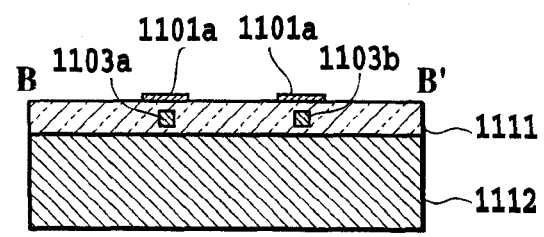
Figure 6:
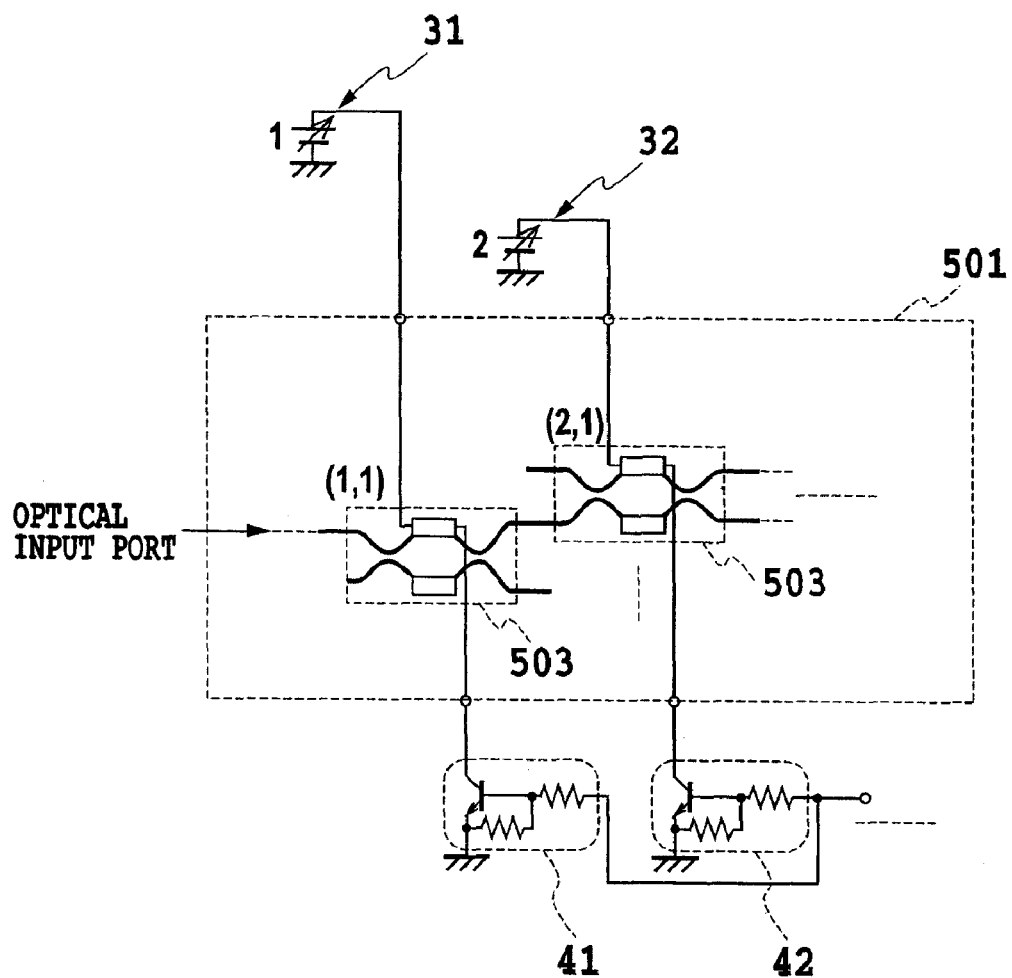
FIG. 6 is a circuit diagram showing a configuration of driving current supply circuits of the conventional tree type 1×8 optical switch.

When the 1×2 optical switch consists of the MZI optical switch circuit as shown in FIGS. 3A-3C, an example of the electrical circuit for driving it is given by FIG. 6. As shown in FIG. 6, the heaters have their first ends connected to the driving power supplies (driving circuits) 31 and 32 capable of analog outputs, and their second ends connected to the electrical digital switches 41 and 42. The outputs of the analog power supply circuits 31 and 32 are individually adjusted at the optimum driving voltages for the optical switch units 1-1 and 2-1 previously. On the other hand, the electrical digital switches 41 and 42, which consist of an IC (integrated circuit) including multiple transistor circuits, are brought into conduction or out of conduction in response to TTL level inputs. As in the 1×8 optical switch shown in FIG. 7, the optical switch units of each stage share the analog driving circuit 31 or 32.

FIG. 8 shows the circuit arrangement of FIG. 7 in more detail. As shown in FIG. 8, each stage can share the analog driving circuit 31 or 32 without losing the individually adjusting function that enables the analog driving circuits 31 and 32 to apply individually adjusted voltages to the optical switch units 1-1 and 2-1. This is because only one optical switch is brought into conduction in each stage all at once. Thus carrying out the sharing on the PLC substrate can reduce the area of the electrical wiring region on the substrate, and reduce the number of the connection wires from the PLC substrate to the outside and the number of the analog driving circuits.

However, as the scale of the optical switch increases recently, further miniaturization is necessary by reducing the electrical wiring on the substrate. Let us return here to the example of 1×128 optical switch of FIG. 5. The driving signal power supply lines 507 in the upper side of FIG. 5 are connected to the analog driving circuits 31 and 32 on the analog feeding side, and the heater driving wires 523 in the lower side are connected to the electrical digital switches 41 and 42. As for the analog feeding side of the unit optical switches 503, each stage can share them in accordance with the scheme as described above with reference to FIGS. 7 and 8.

Figure 14:
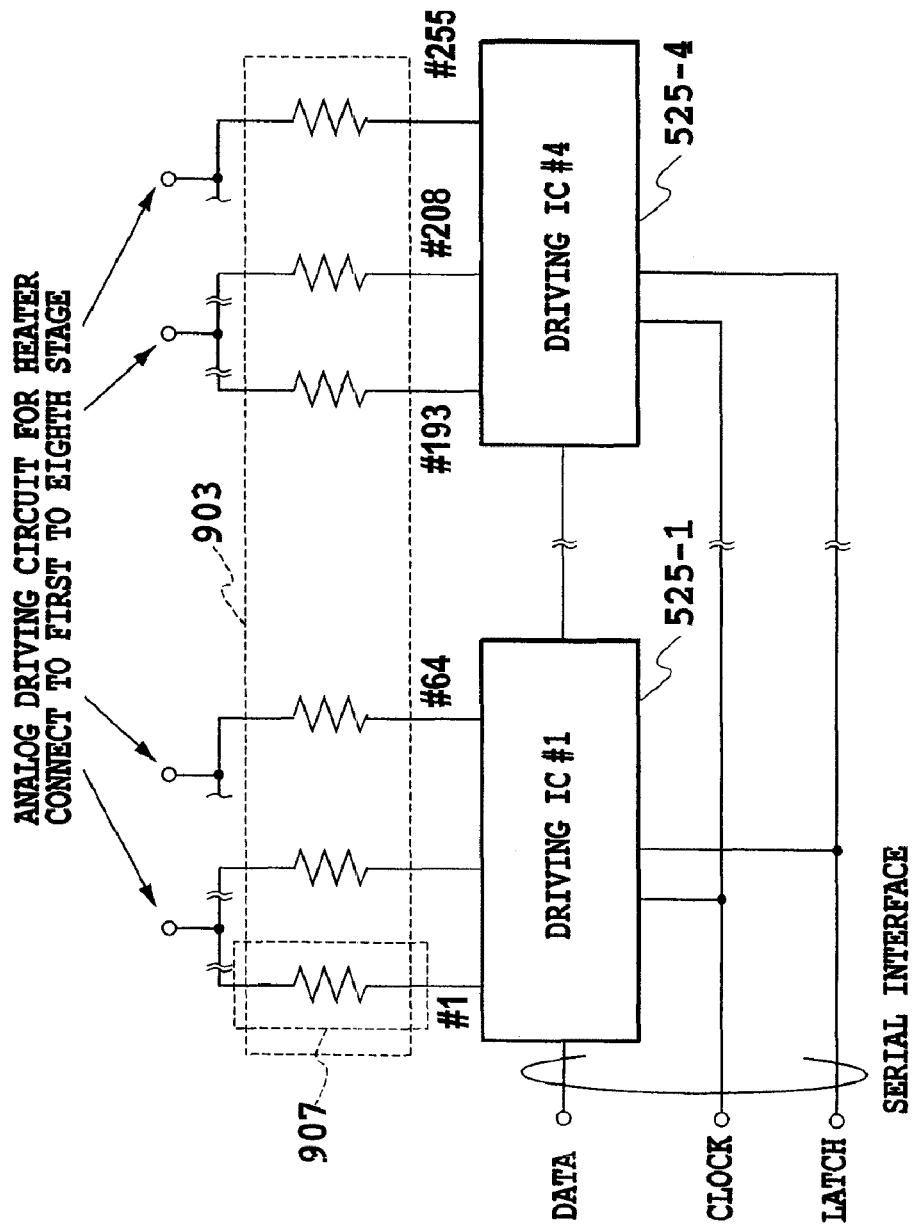
FIG. 14 is a circuit diagram showing a configuration of an electrical circuit including driving digital ICs, a basic arrangement of fifth to eighth embodiments in accordance with the present invention.

In contrast, as for the electrical digital switch side of the optical switch units 503, they are pulled to the substrate edge by the gold electrical circuits 509, connected to the external substrate 521 via wires 513 that connect the gold wiring electrode pads 511 and 515, and then connected to the driving ICs 525. The electrical circuit including the ICs 525 is configured as shown in FIG. 14 in the present invention. The tree type 1×128 optical switch 501 of FIG. 5 includes 255 optical switch units 503 (denoted by #1-#255 in FIG. 14). The optical switch units 503 have their individual heaters 907 connected to four 64-bit driving ICs 525-1-525-4 as illustrated in FIG. 14. The driving ICs 525-1-525-4 are a CMOS IC (CMOS integrated circuit) including a shift register and a latch (not shown), and have both functions of the digital switches 41 and 42 and the serial/parallel converter (not shown). The driving IC 525-1-525-4 can be extended to 64 bits×4=256 bits by synchronizing each other by connecting in cascade as shown in FIG. 14.

Figure 15:
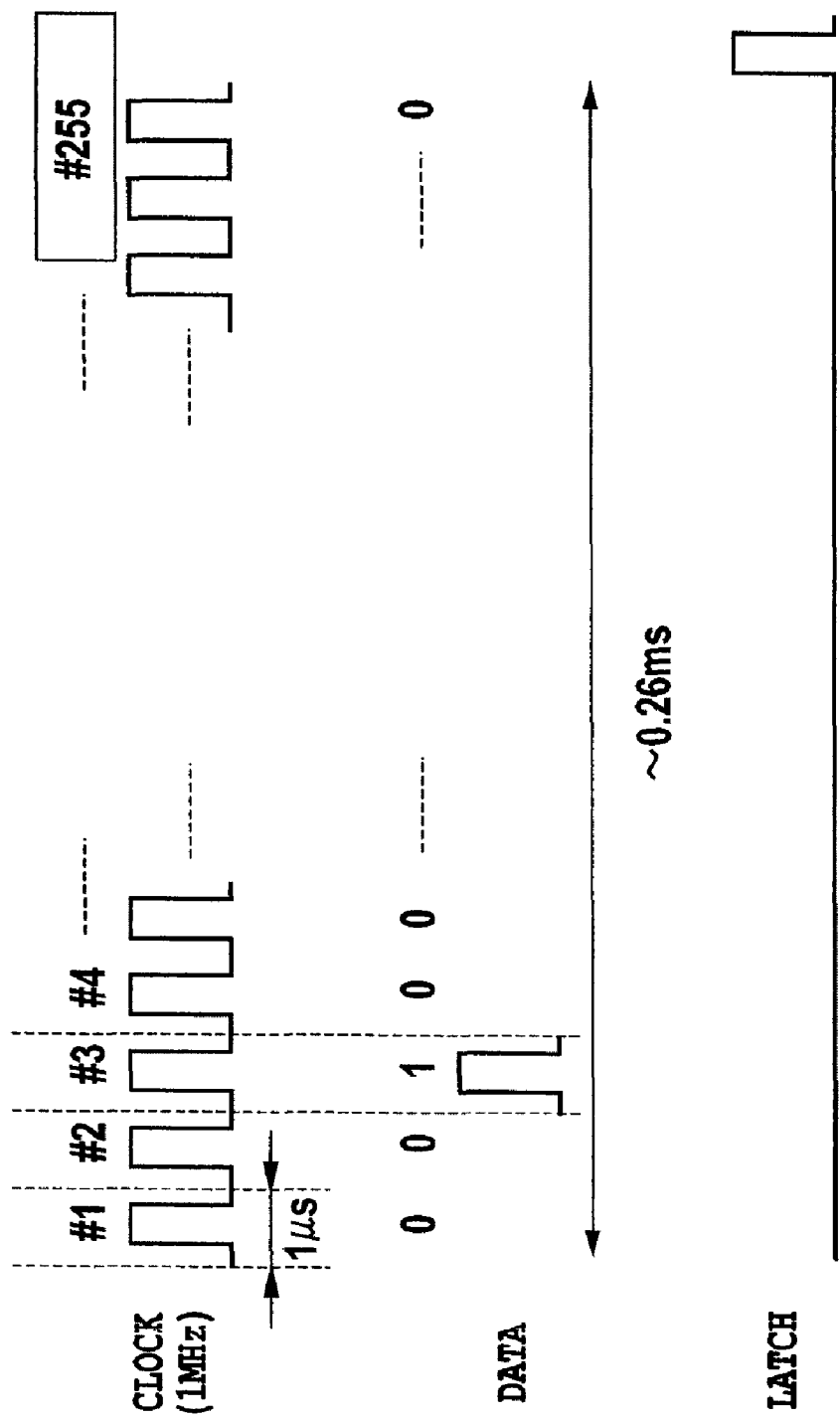
FIG. 15 is a time chart illustrating timing of a heater control signal applied to the heater array of FIG. 14.

Consider a case where a 1-MHz clock signal is used for driving the ICs 525-1-525-4 as illustrated in FIG. 15. The ON/OFF control of each of the heaters 907 is assigned to individual time base in response to each pulse of the clock signal. Thus, the individual digital switch (41 of FIG. 6) can be turned on and off with some switching speed within the period of 0.26 ms of the latch pulse. Since the switching speed of the thermooptic switch, 2 ms typical, is much slower than the clock signal, the ON/OFF control of the 256 heaters 907 can be carried out in response to the three input signals with respect to the input and output of the ICs 525-1-525-4.

Although the example of FIG. 15 uses the clock signal with a rate of 1 MHz, using a clock signal with a rate of 10 MHz will enable 2,560 heaters to be switched by latching at every 0.26 ms. Thus selecting the clock rate appropriately makes it possible to control a lot of heaters.

In addition, according to the present invention, the driving ICs 525-1-525-4 are mounted on the PLC substrate as small type bare chips with a size of 2 mm×7 mm, for example, as will be described later with reference to FIG. 16. Thus, the wiring between the heaters and the ICs on the PLC substrate can be integrated to reduce from 255 to only three signal lines. Therefore, the present embodiment can sharply reduce the area of the electrical wiring, and hence the area of the PLC substrate.

Furthermore, according to the present invention, since the driving ICs are mounted on the PLC substrate, the number of wires to be pulled out of the PLC substrate is sharply reduced to 20. As a result, the number of wires between the PLC substrate and the electrical circuit substrate, on which the electrical driving circuits are mounted, can be reduce to 20, thereby being able to greatly reduce the number of the wire bondings from 510 to 20.

Furthermore, according to the present invention, the module can be miniaturized greatly because the driving IC assembly substrate is removed.

Moreover, according to the present invention, the number of the electrodes of the probe for the inspection at the PLC substrate level before assembling the module in the fabrication process can be reduced from 510 to 20 because the driving ICs are mounted on the PLC substrate. Therefore the present embodiment can simplify the electrical probe and the device for aligning the probe.

Figure 16:
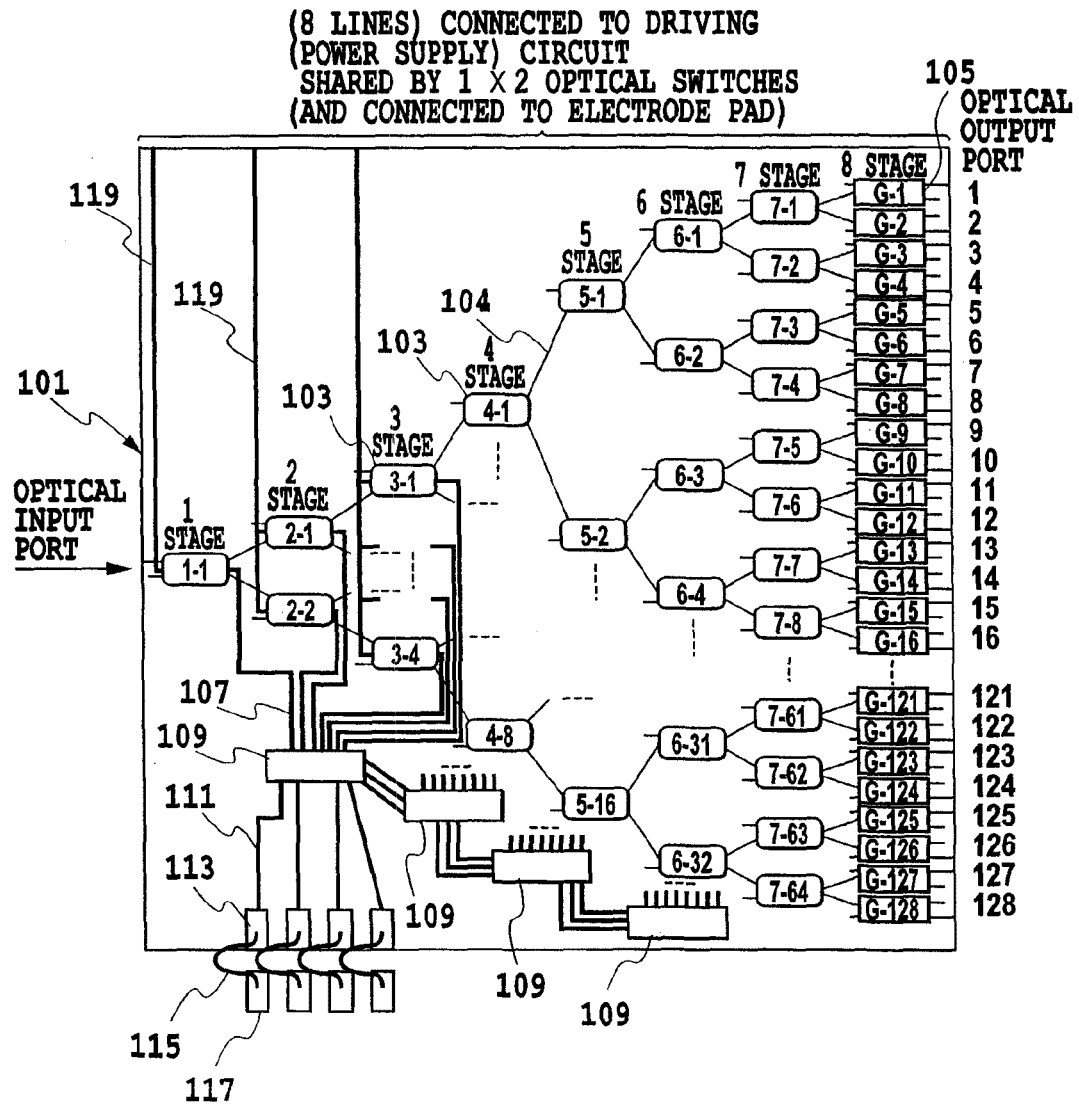
FIG. 16 is a schematic plan view showing a configuration of a 1×128 PLC thermooptic switch incorporating IC bare chips of a fifth embodiment in accordance with the present invention.

FIG. 16 is a schematic plan view showing a fifth embodiment of the optical module in accordance with the present invention. The present embodiment is an example of a 1×128 PLC thermooptic switch in accordance with the present invention, in which the driving ICs are mounted on the PLC substrate. In FIG. 16, the wiring of the optical switch units in the fourth and later stage is omitted for the simplicity of the drawing. In FIG. 16, the reference numeral 101 designates the 1×128 PLC thermooptic switch (1×128 optical switch). Each reference numeral 103 designates a 1×2 optical switch, 104 designates an optical waveguide, 105 designates a gate optical switch, 107 designates a heater driving gold electrical circuit, 109 designates a basic switch driving IC (bare chip) (corresponding to the driving ICs 525-1-525-4 of FIG. 14), 111 designates a gold electrical circuit for control signal, 113 designates an electrode pad, 115 designates a gold wire, 117 designates an electrode pad, and 119 designates a driving signal power supply line (power supply line used by the driving power supply circuit).

The 1×2 optical switches 103 and optical waveguides 104 of the present embodiment have the same arrangements as their counterparts of FIGS. 3A-3C. In the 1×128 PLC thermooptic switch 101, the optical waveguides 104 are formed on the Si substrate by the flame hydrolysis deposition method. The heaters 907 are formed by patterning a Ta2N film. In addition, the electrical wiring 107 of the heaters are formed by patterning a gold thin film on the Si substrate.

The present embodiment differs from the conventional example in the following electrical wiring structure. Specifically, as shown in FIG. 16, the present embodiment shares the power supply lines 119 of the driving power supply circuits on the PLC substrate to reduce the area of the electrical wiring, and mounts the heater driving ICs 109 on the PLC substrate in the form of bare chips.

Figure 17:
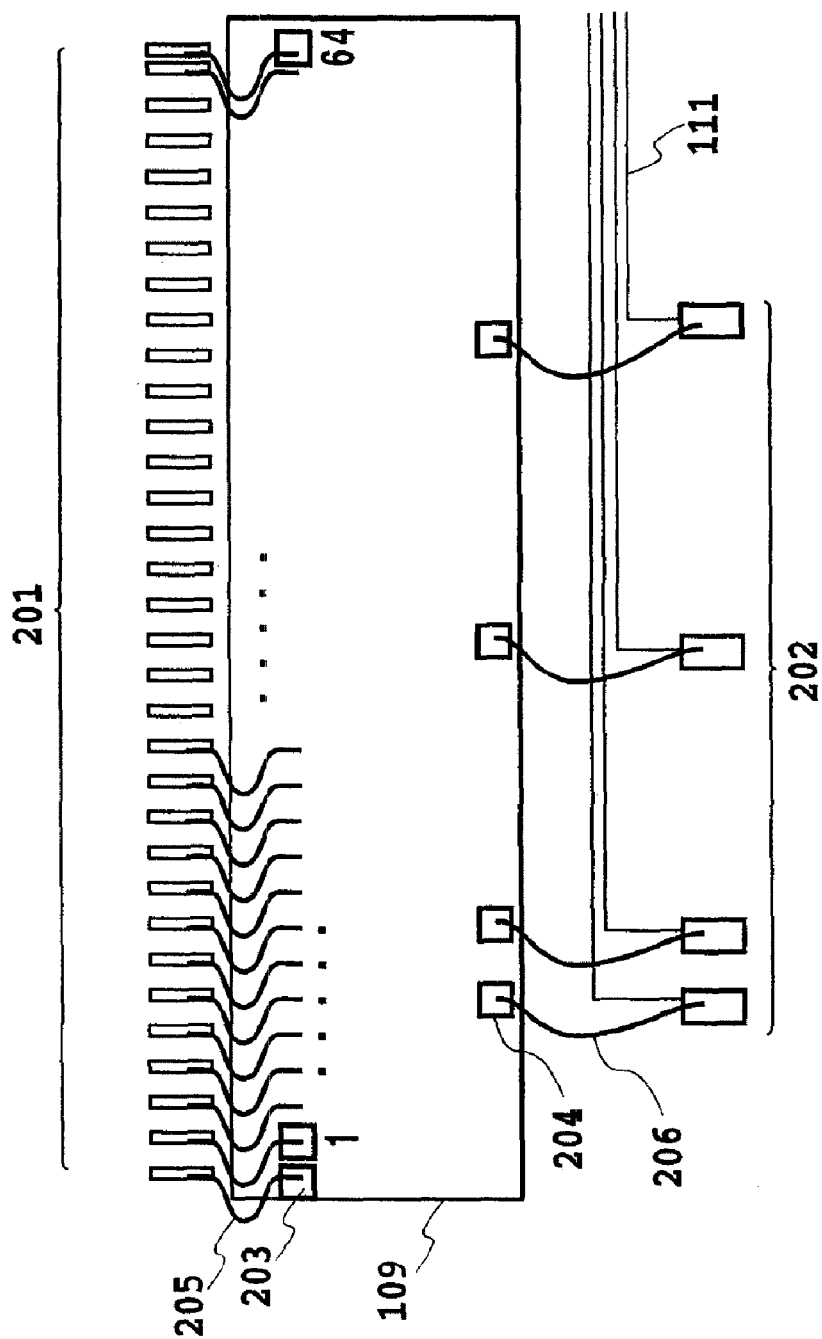
FIG. 17 is an enlarged illustration showing details of the IC bare chip assembly of FIG. 16.

Each heater driving IC bare chip 109 is fixed to the PLC substrate with electrode pads 203 and 204 facing upward as illustrated in an enlarged view of FIG. 17. The first electrode pads 203 are connected to the heaters of the optical switch units 103. The second electrode pads 204 are connected to the gate control signals. The second electrode pads 204 include from left to right in FIG. 17, a GND terminal, a clock terminal, a latch terminal and a signal terminal, and gold thin film wires 111 (shown in FIG. 16) are pulled out from the second electrode pads 204.

Then, the electrode pads 201 and 202 on the PLC substrate are connected to the electrode pads 203 and 204 on the heater driving IC 109 by the gold wires 205 and 206. In addition, the IC 109 and gold wires 205 and 206 are subjected to resin molding by silicone resin (not shown) to improve their reliability. Such an assembly of the IC bare chip is generally formed on the electrical wiring substrate, and can ensure the reliability unlike the wire bonding between the substrates as shown in FIG. 5.

Take notice here that an optical waveguide circuit substrate of a large-scale optical switch must include many, say, up to several hundred phase shifters (heaters) dispersed in a broad region thereon. However, it is very difficult to carry out the fine electrical wiring process on the optical waveguide circuit substrate. Thus, fabricating the driving electrical circuits of the phase shifters (heaters) on the same substrate (optical waveguide circuit substrate) presents a new problem different from fabricating the conventional electrical circuit and integrated circuit.

The present embodiment solves the new problem by mounting the gates of the driving ICs on the Si substrate and by grouping (sharing) them as shown in FIGS. 14 and 15. Thus, it should be noted that the present invention not only mounts the driving ICs on the Si substrate. For reference purposes, there has been no report to date that driving ICs or control ICs of an optical switch are assembled on the PLC substrate.

As for the driving circuit using the ICs, it can drive 256 heaters 907 simultaneously through three heater control signals consisting of the clock, latch and signal (data) as described above with reference to FIGS. 8, 14 and 15.

With the foregoing arrangement, the present embodiment can offer the following advantages.

(1) It can reduce the area of the electrical wiring on the PLC substrate.

(2) It can obviate the need for the IC assembly substrate, thereby being able to reduce the module size.

(3) It can reduce the number of wire bondings between the PLC substrate and the electronic circuit substrate.

(4) It can simplify the inspection process.

These advantages will be described below.

(1) Reduction in the area of the electrical wiring on the PLC substrate.

In the conventional example as shown in FIG. 5, since all the heater driving gold electrical circuits must be pulled to the electrode pads at the substrate edge, the area of the electrical wiring region increases by just that much, thereby increasing the size of the entire substrate. In contrast with this, in the present embodiment of FIG. 16, since the driving IC gates are mounted and grouped on the PLC substrate, the 255 heater wires are only pulled to their nearest driving ICs. Thus, the length of the electrical wiring is shortened, and the area of the electrical wiring on the PLC substrate is greatly reduced.

The reduction in the area of the wiring will be estimated quantitatively. The $Ta_2N$ film heaters must pass a current of 60 mA at the maximum, for example. Accordingly, the gold electrical circuits preferably consist of about 50 μm wide electric wiring in a single layer, considering that it will be necessary to pattern them on a warped optical waveguide substrate that will hamper the fabrication process. The spacing between the wiring must be secured about 50 μm, as well. Estimating the area required for developing the electrical wiring under the foregoing conditions results in the total wiring width of 25.6 mm for the 256 wiring. As a typical example, assume that the wiring length from the individual heaters to the heater driving ICs is 15 mm at the average, and the wiring length when the heater driving gold electrical circuits are pulled to the substrate edge without the heater driving IC is 60 mm at the average. Then the area of the electrical wiring region from the heaters to the digital switch side is reduced to a quarter.

The reduction in the area of the electrical wiring is independent of the advantages of the foregoing (2) and (3). Accordingly, it is enough for the heater driving ICs 109 to be placed on the optical waveguide substrate in such a manner that the area of the electrical wiring region becomes minimum, or the wiring becomes shortest.

FIGS. 16 and 5 are schematic views that cannot show a detailed electrical wiring layout. As for the conventional example of the 1×128 optical switch as shown in FIG. 5, the area of its optical waveguide substrate is 57 mm×60 mm, and the miniaturization of the PLC substrate is limited by the electrical wiring region. In contrast with this, the present embodiment can reduce the area of the electrical wiring region to a quarter, thereby being able to miniaturize the PLC substrate to 30 mm×60 mm.

(2) Reduction in module size because of the IC assembly substrate is made redundant.

It is obvious that assembling the heater driving ICs on the PLC substrate can reduce the module size by an amount corresponding to the IC assembly substrate section.

(3) Reduction in the number of wire bondings between the PLC substrate and the electronic circuit substrate.

Since the present embodiment assembles the heater driving ICs on the PLC substrate, it can sharply reduce the number of wire bondings between the two substrates. In contrast to about 510 wires between the substrates in the conventional example, the present embodiment can reduce it to 20, including three signal lines and 17 power supply lines and the like. The number of wires of 20 or so can completely avoid the expansion of the width of the wire connections between the substrates such as a few tens of millimeters in the conventional example, thereby being able to prevent the degradation in the reliability. The present embodiment can narrow the width of the wire bonding region to 2.8 mm, and can establish connections individually with cables without using the wires. Thus, it can completely solve the problems involved in the wire bonding.

(4) Simplification of the inspection process.

In the present embodiment, an inspection is carried out to check as to whether a product with desired characteristics has been made at the step of the PLC substrate in the actual module fabrication process by bringing the electrical probe into contact to drive the heaters from the outside. In the conventional example, it is necessary to bring the electrical probe into contact with the 510 electrode pads simultaneously, which demands an expensive special electrical probe and aligning equipment enabling the electrical probe to make contact at high parallelism. In contrast with this, the present embodiment as shown in FIG. 16 can reduce the number of the electrode pads to be brought into contact to 20, which enables an inexpensive electrical probe to make contact with the electrode pads easily, thereby facilitating the inspection. Thus, it can sharply reduce the members, cost of equipment and time required for the inspection process.

In summary, the present embodiment assembles the bare chips of the optical switch driving ICs directly on the PLC substrate. Accordingly, it can sharply reduce the electrical wiring region, miniaturize the PLC substrate, greatly reduce the number of the gold wires between the substrates from 256 to 20, and increase the yield and reliability. In addition, the present embodiment can sharply reduce the module size by the amount corresponding to the removal of the driving IC assembly substrate. Furthermore, it can simplify the probe and equipment required for the inspection process, thereby being able to reduce its cost and time.

Figure 18:
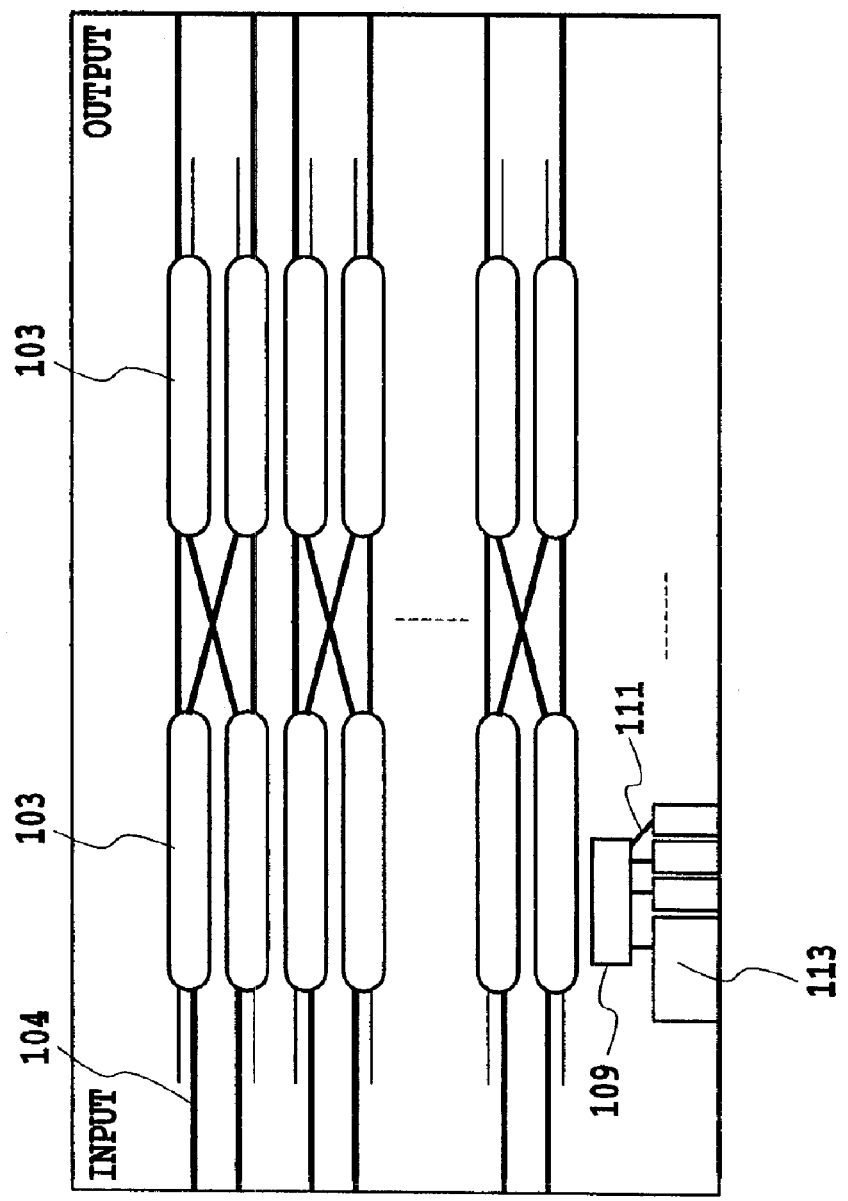
FIG. 18 is a schematic plan view showing an assembly incorporating an IC bare chip into an array of eight 2×2 optical switches as a variation of the fifth embodiment in accordance with the present invention.

The present invention is applicable not only to a single large scale switch as shown in FIG. 16, but also to an integrated circuit including eight array of 2×2 optical switch units on a same PLC substrate, which is used as an optical add/drop multiplexer/demultiplexer, for example, offering the same advantages as described above. FIG. 18 shows an example of such an arrangement. In FIG. 18, the electrical wiring between the optical switch units 103 and IC 109 are omitted for the sake of simplifying the drawing.

The present invention is also applicable to a variable optical attenuator and its arrayed module, a dispersion compensator, and a gain equalizer with offering similar advantages.

Furthermore, it is obvious that the present invention is applicable to optical switch and the like using an optical circuit other than the PLC substrate with offering the same advantages as the case of using the PLC substrate. For example, the present invention is applicable to an optical switch using $LiNbO_3$ (LN) optical waveguides with offering the same advantages as the case of using the PLC substrate.

Sixth Embodiment

Figure 19:
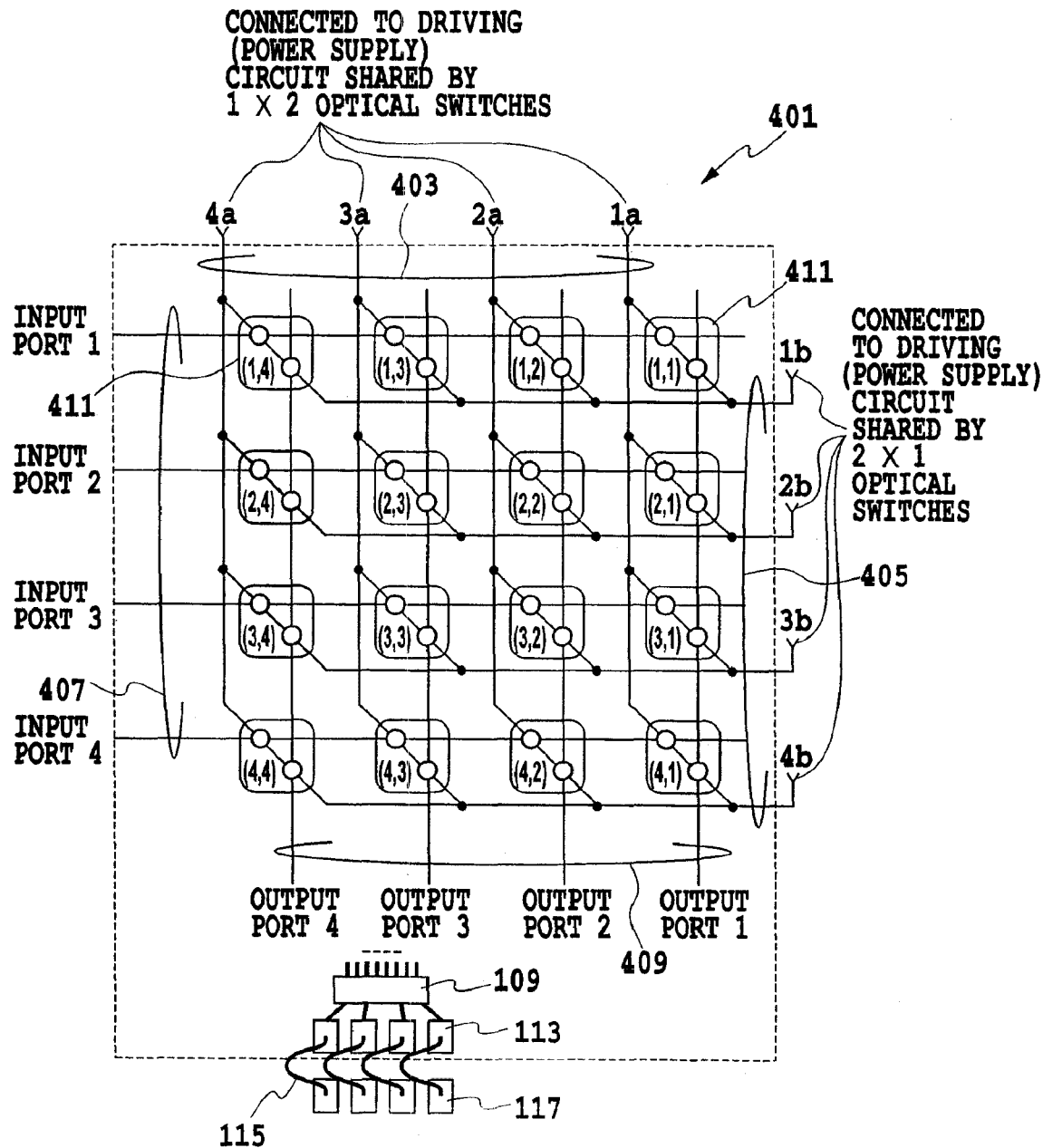
FIG. 19 is a schematic plan view showing a configuration incorporating the IC bare chip into a PLC chip of a 4×4 matrix optical switch of a sixth embodiment in accordance with the present invention.

FIG. 19 shows an arrangement of a 4×4 optical matrix switch of a sixth embodiment in accordance with the present invention. The 4×4 optical matrix switch 401 includes four input waveguides 407 and four output waveguides 409, which intersect in a grating fashion at 16 locations, and duplex type optical cross-point switches 411 placed at the individual intersections.

Figure 20:
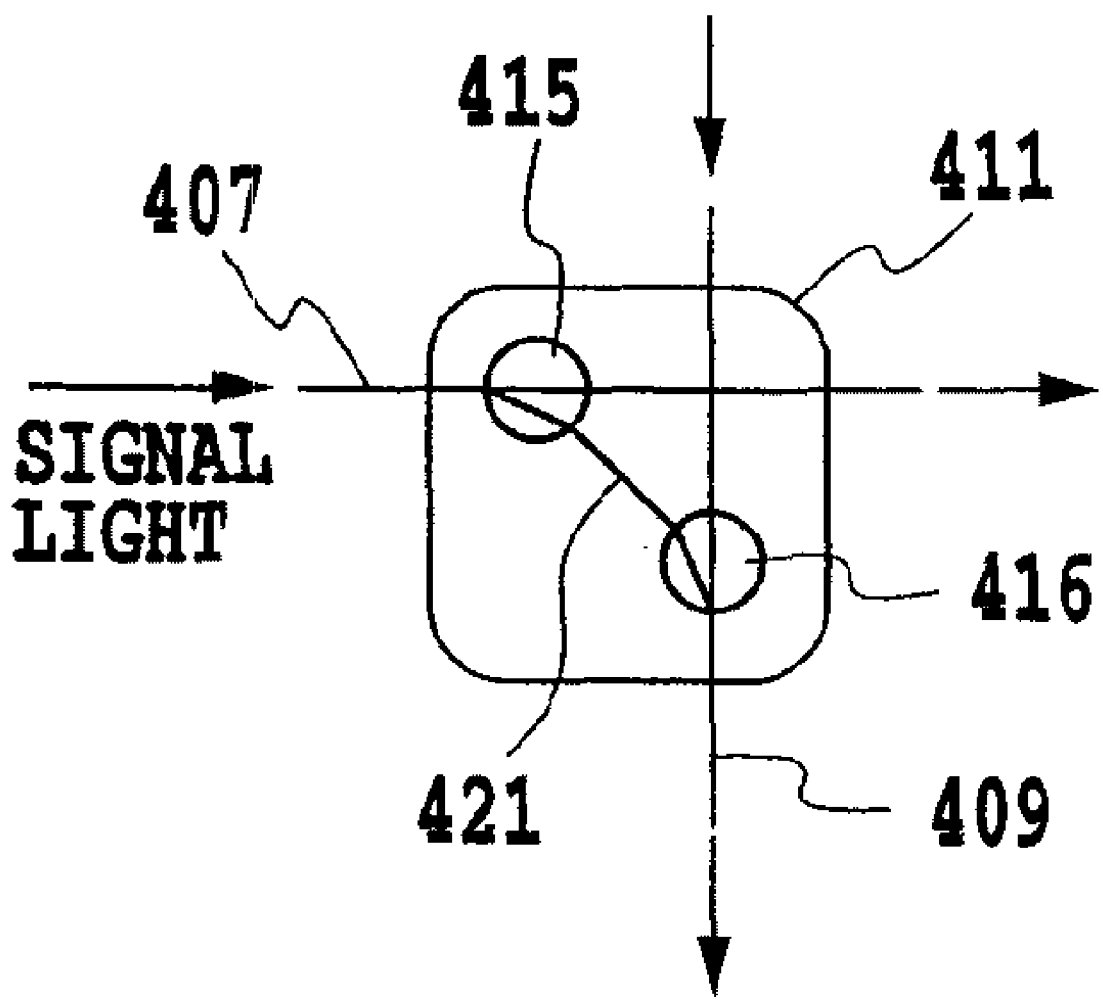
FIG. 20 is an enlarged view of a duplex type optical switch of FIG. 19 constituting an optical matrix switch completly individually drivable by a small number of driving circuits.

FIG. 20 is an enlarged view showing the duplex type optical cross-point switch 411. The duplex type optical cross-point switch 411 includes a 1×2 optical switch 415, a 2×1 optical switch 416 and an intra-unit waveguide 421 connected between them. In addition, as shown in FIG. 19, the vertical four driving signal power supply lines 403 connect the 1×2 optical switches 415 on the individual lines to corresponding driving (power supply) circuits shared by the 1×2 optical switches. Furthermore, the horizontal four driving signal power supply lines 405 connect the 2×1 optical switches 416 on the individual lines to corresponding driving (power supply) circuits shared by the 2×1 optical switches.

Figure 21:
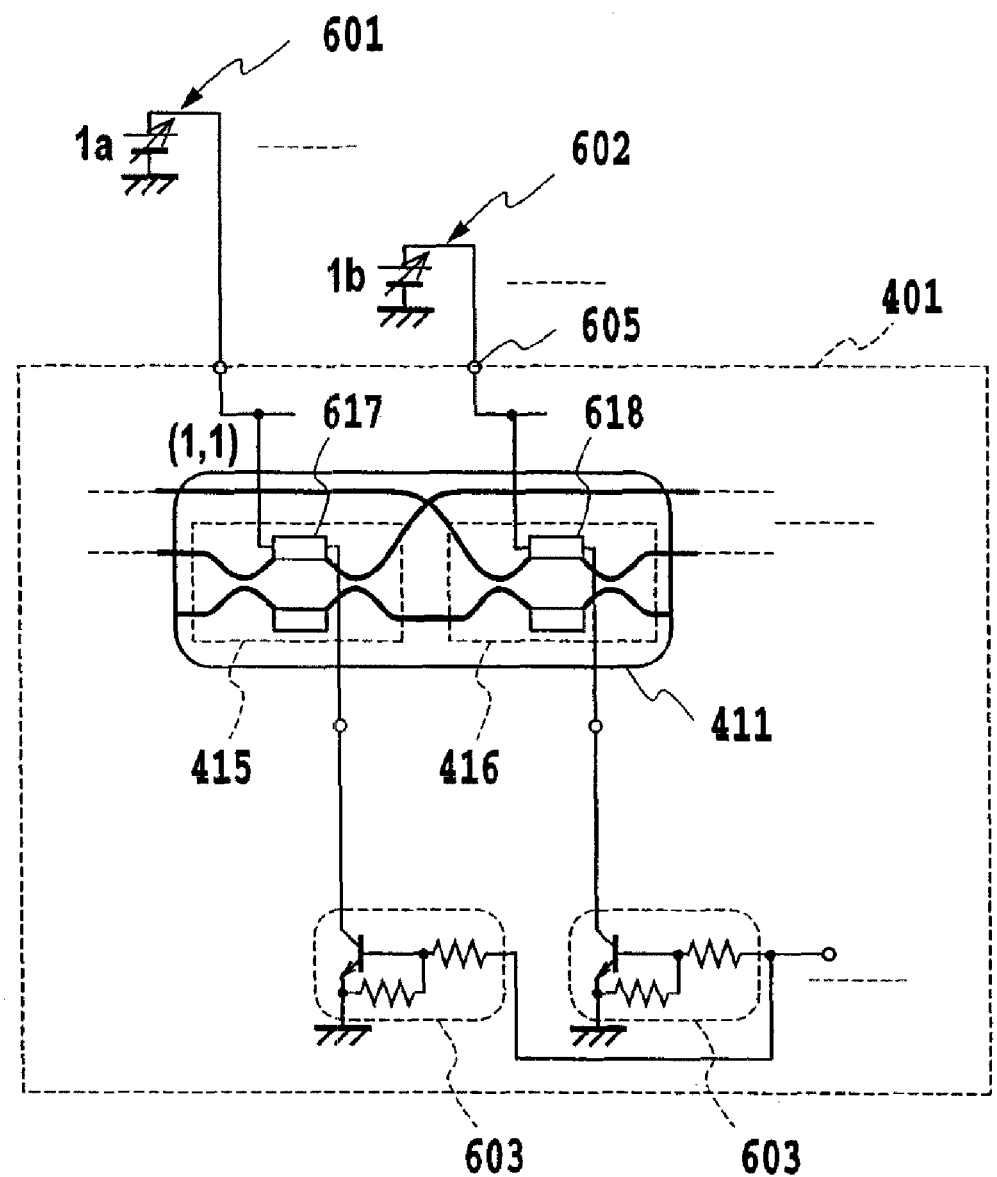
FIG. 21 is a circuit diagram showing a concrete circuit configuration of the sixth embodiment in accordance with the present invention.

FIG. 21 shows a concrete arrangement of the duplex type optical cross-point switch 411 and electrical control circuit. In FIG. 21, the reference numeral 401 designates the optical matrix chip, 411 designates the duplex type optical switch unit, 601 designates a driving (analog power supply) circuit shared by the 1×2 optical switches, 602 designates a driving (analog power supply) circuit shared by the 2×1 optical switches, and each reference numeral 603 designates an electrical digital switch.

The 1×2 optical switch 415 and 2×1 optical switch 416 constituting the duplex type optical cross-point switch 411 each employ an MZI optical switch having an optical path difference of half a wavelength as the conventional example. In the individual MZI optical switches, thermooptic heaters 617 and 618 on the arm waveguides with a shorter optical path have electrical wiring connected thereto. The first ends of the electrical wiring are connected to the electrical digital switches 603, and the second ends of the electrical wiring are connected to the driving power supplies (driving circuits) 601 and 602 capable of analog output. The electrical digital switches 603 are each incorporated into an IC including many transistor circuits integrated therein so that the TTL level input can bring them into conduction or out of conduction.

The present embodiment differs noticeably from the conventional arrangement in the following points as shown in FIGS. 19 and 20.

(1) The analog driving circuits are shared by the 1×2 optical switches for each output waveguide, and by the 2×1 optical switches for each input waveguide.

(2) The heater driving IC is mounted on the PLC substrate as a bare chip.

The different points will be described in more detail.

Referring to FIGS. 19 and 20, (1) sharing of the analog driving circuits will be described. The shared driving circuit 1a is connected to four optical cross-point switches $SW_{x,1}$ in parallel, each of which consists of a 1×2 optical switch, where x=1-4. Likewise, the shared driving circuits 2a-4a are connected to the optical cross-point switches $SW_{x,2}$-$SW_{x,4}$ in parallel, respectively. In addition, the shared driving circuit 1b is connected to four optical cross-point switches $SW_{1,y}$ in parallel, each of which consists of a 2×1 optical switch, where y=1-4. Likewise, the shared driving circuits 2b-3b are connected to the optical cross-point switches $SW_{2,y}$-$SW_{4,y}$ in parallel, respectively.

Thus, the number of the driving circuits can be reduced from 16 required for the individual connections to eight. In addition, since the wiring to the driving circuits is partially shared by each driving circuit used in common, it is possible to reduce the area of the wiring, and to reduce the electrical contact terminals from the switch chip all together.

Furthermore, (2) assembling the bare chips of the heater driving IC 109 on the PLC substrate differ from the conventional example. The assembly is implemented as described in connection with FIG. 17. In FIG. 19, the IC bare chip 109 is connected to the 32 MZI circuits individually through the heater driving wiring, and operates as the electrical digital switches 603 to bring the MZI circuits into conduction or out of conduction. As for an M×L matrix switch, where M and L are integers equal to or greater than three, it can offer advantages similar to the advantages (1)-(4) of the fifth embodiment as described in detail in the fifth embodiment. For example, although there are 32 electrical digital switches 603 corresponding to the 32 optical cross-points, the number of connections between the heaters 618 and the IC 109 is reduced to three. Accordingly, the area of the electrical wiring region is decreased and the number of wires between the substrates is reduced concurrently. Although the description is made by way of example of 4×4 matrix switch here, such above reduction effect increases with the scale of the optical matrix switch chip.

As for the two 3-dB couplers (see 1102a and 1102b of FIGS. 3A-3C) in the present MZI optical switch, directional couplers are employed which are each constructed by placing two waveguides side by side in close proximity of about several micrometers. This is because the directional couplers have an insertion loss smaller than other means. However, the 3-dB couplers are not limited to the arrangement, allowing other means. For example, it is certainly possible to use a multimode interferometer (MZI) couplers using multimode waveguides, or wavelength independent couplers (WINC) constructed by cascading these couplers.

Seventh Embodiment

Figure 22:
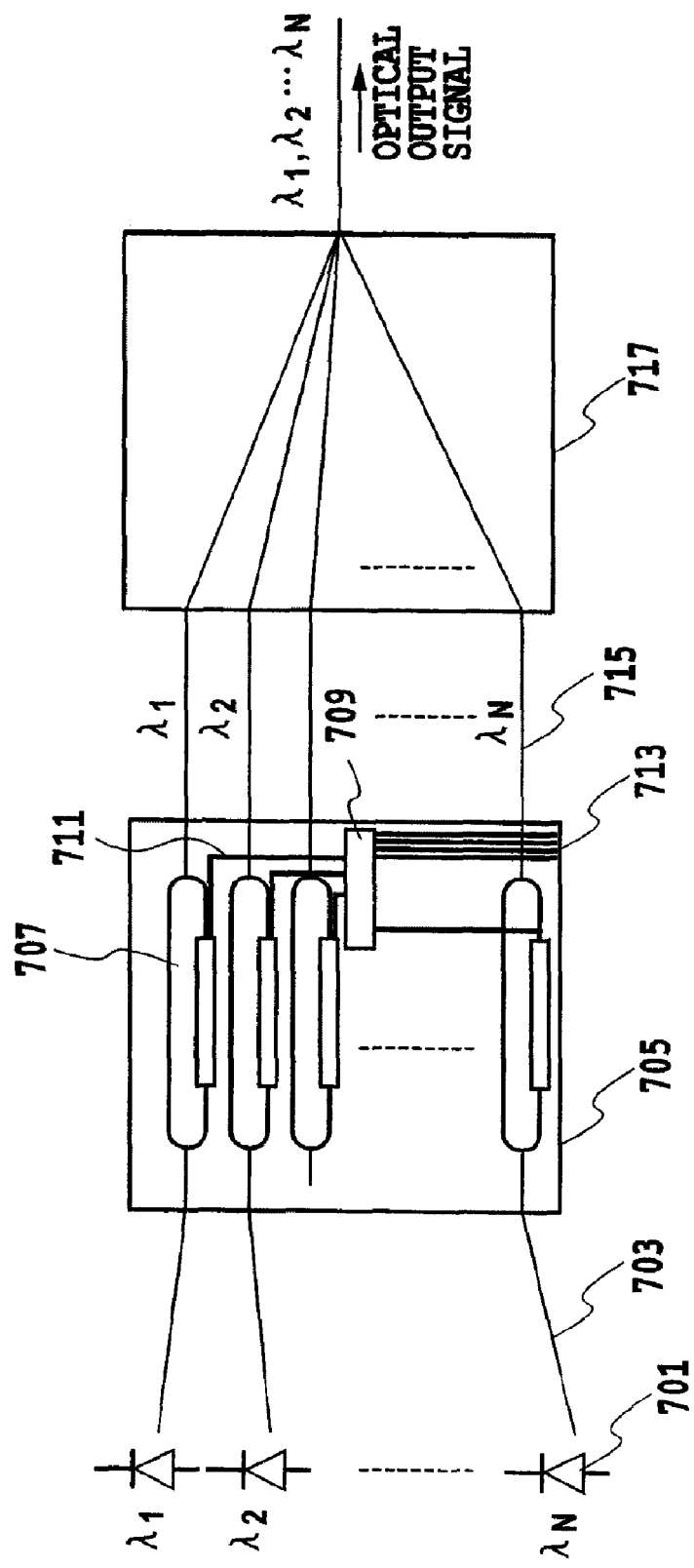
FIG. 22 is a schematic plan view showing a configuration of a transmitter module including a variable optical attenuator a seventh embodiment in accordance with the present invention.

FIG. 22 shows a transmitter module including a variable optical attenuator using an MZI circuit formed on a silica-based PLC substrate as a seventh embodiment in accordance with the present invention. The transmitter module comprises the following components. In the left-hand side of this figure, a plurality of laser diodes 701 for WDM signals is disposed for wavelengths λ1-λN. The laser diodes 701 have their outputs connected through optical fibers 703 to Mach-Zehnder type variable optical attenuators 707 using an MZI circuit fabricated from a silica-based PLC and the arrayed module of the attenuators 707 is fabricated on a PLC substrate 705. The variable optical attenuators 707 have their outputs connected to an arrayed waveguide grating (AWG) 717 through optical fibers 715. The AWG 717 is formed on a PLC substrate (optical waveguides of the AWG are omitted from the drawing).

The MZI circuit incorporates a bare chip IC 709 for driving the variable optical attenuators 707 on the same substrate. Here, the reference numeral 711 designates a gold electrical circuit for driving heaters, and 713 designates a gold electrical circuit for driving the IC 709. The variable optical attenuators 707 consist of the MZI circuits (Mach-Zehnder interferometer type optical switches) described before in connection with FIGS. 3A-3C, and are operated by a continuous current in an analog fashion. Incidentally, the driving IC 709 controls not only the gate switches, but also the amount of the current to be passed through the variable optical attenuators 707. The amount of the current to be passed in an analog manner is controlled by a control signal produced by digitizing the corresponding current amount. The IC used for the control can be a single chip or a combination of a plurality of chips as long as it can carry out the analog control of the individual variable optical attenuators 707. As for the PLC substrate 705 including the variable optical attenuators 707, the electrical wiring on the substrate is integrated into the IC mounted as in the foregoing fifth embodiment, thereby being able to offer the same advantages as the advantages (1)-(4) enumerated in the fifth embodiment.

Although the present embodiment is described by way of example of the variable optical attenuator using a silica-based PLC, the present invention is applicable to optical waveguide circuits using other materials. In addition, the type of the optical circuit is not limited to the MZI. For example, it is obvious that a circuit using a Y branch can also be employed.

Eighth Embodiment

Figure 23:
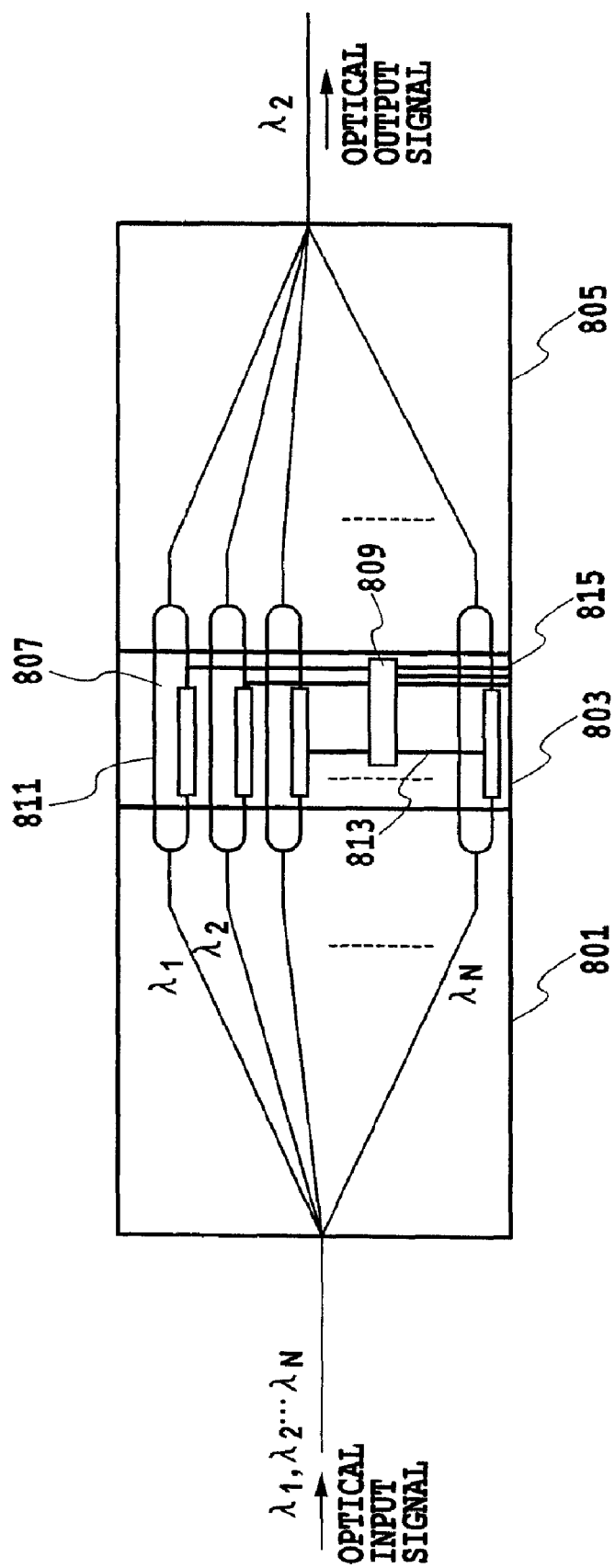
FIG. 23 is a schematic plan view showing a configuration of a wavelength selector of an eighth embodiment in accordance with the present invention.

FIG. 23 shows a wavelength selector for selecting a given wavelength from a multi-wavelength optical signal as an eighth embodiment in accordance with the present invention. The wavelength selector is a PLC-LN type optical switch fabricated by joining a PLC substrate and an LN optical waveguide substrate at their ends. In FIG. 23, the reference numeral 801 designates a first substrate composed of a PLC including an arrayed waveguide grating, 803 designates a second substrate composed of LiNbO$_3$ (LN), and 805 designates a third substrate composed of a PLC including an arrayed waveguide grating. The three substrates are joined in this order at their ends by a bonding adhesive. The reference numeral 809 designates a driving IC mounted on the second substrate 803. Each reference numeral 811 designates a LiNbO$_3$ optical waveguide formed on the LN substrate 803. The reference numeral 813 designates a heater driving gold electrical circuit, and 815 designates an IC control gold electrical circuit.

In the present embodiment, arrayed waveguide gratings (AWGs) are formed on the PLC substrates 801 and 805, though the optical waveguides such as the AWGs are not shown in FIG. 23. The MZI circuits 807 are each composed of a coupler on the PLC substrate 801 and the LN optical waveguides 811 on the LN substrate 803. The phase variation of half a wavelength required for the optical switching is given by the electro-optic effect by the voltage applied to the heater on the LN optical waveguide 811. The example uses the MZI optical switch as an ON/OFF type optical gate switch.

An N-wavelength WDM signal (wavelengths) λ1, λ2, λ3, ... 2 and λN) input via the optical input port at the left-hand side of FIG. 23 is demultiplexed into individual wavelengths by the AWG on the first PLC substrate 801. Subsequently, the individual wavelengths are passed through the MZI circuits 807 on the second substrate 803 at the center so that only one or more desired wavelength are selected by the gate switch function of the MZI circuits 807. Then, the selected one or more wavelengths are multiplexed again by an output side AWG (not shown in FIG. 23) on the third PLC substrate 805. As just described, the PLC-LN type optical switch of the present embodiment functions as a wavelength selector for selecting any desired wavelengths from the wavelength division multiplexed optical signal. FIG. 23 illustrates an example that selects only the optical signal with the wavelength λ2.

A combination of the silica-based PLC substrate and an optical waveguide circuit composed of other materials as the present embodiment offers the following advantages. It can utilize an extensive menu of optical circuits such as AWGs implemented by PLC substrates. In addition, the PLC substrate has a smaller radius of curvature of an optical waveguide with proven performance than the other material's substrate, thereby enabling fabrication of a high performance circuit with a smaller size. Furthermore, as an optical switch, using the LN substrate offers an advantage of being able to implement a high speed optical switching at low power consumption.

The circuit including an optical switch having a combination of the PLC-LN substrates can offer the advantages similar to the advantages (1)-(4) described in the fifth embodiment by directly mounting the IC on the optical circuit substrate.

Although the present embodiment is described by way of example of the wavelength selector, other optical circuits can offer similar advantages. For example, utilizing the structure of the present embodiment makes it possible to arrange a tree-type optical switch such as a 1×8 optical switch similar to that of FIG. 16. In this case, the 1×8 optical switch offers the advantages similar to the advantages (1)-(4) described in the fifth embodiment.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An optical module comprising:
a silica-based 3-dimensional optical waveguide circuit;
a plurality of driving electronic devices for controlling the driving of optical switch units having heater elements to modify an optical output characteristic of said optical waveguide circuit by causing a refractive index variation of said waveguide circuit by using a thermal-optic effect; and
analog adjustable driving power supply circuits for supplying current to said heater elements;
wherein said driving electronic devices are mounted on a same silica-based substrate of said optical waveguide circuit together with said optical waveguide circuit,
wherein said optical switch units are divided into separate multiple groups, one or more of the groups having a plurality of the optical switch units, each optical switch unit having at least two heater elements,
wherein each analog adjustable driving power supply circuit is electrically connected to all of the optical switch units within a corresponding group, each one of said analog adjustable driving power supply circuits being electrically connected by a corresponding single shared common power supply line to all of the optical switch units of the corresponding group so as to supply current to the heater elements thereof,
wherein wiring from said driving electronic devices is integrated on the silica-based substrate of said optical waveguide circuit in the form of a bare chip, and
wherein said driving electronic devices are provided for every said corresponding group of said optical switch units and integrated on the silica-based substrate of said optical waveguide circuit.

2. The optical module as claimed in claim 1, wherein said optical waveguide circuit consists of an optical switch.

3. The optical module as claimed in claim 1, wherein said optical waveguide circuit consists of a variable optical attenuator.

4. The optical module as claimed in claim 1, wherein the driving electronic devices comprise integrated circuits.

5. The optical module as claimed in claim 1, wherein the driving electronic devices comprise a bare chip mounted on the optical waveguide circuit.

6. An optical module comprising:
an optical waveguide circuit mounted on a substrate, the optical waveguide circuit and the substrate being silica based, the optical waveguide circuit having a refractive index that can be varied by using a thermal-optic effect;
optical switch units having heater elements mounted on the substrate and disposed adjacent the optical waveguide circuit, wherein the optical switch units are divided into separate multiple groups, one or more of the groups having a plurality of the optical switch units, each optical switch unit having at least two heater elements;
analog adjustable driving power supply circuits for supplying current to said heater elements, wherein each analog adjustable driving power supply circuit is electrically connected to all of the optical switch units within a corresponding group, each one of said analog adjustable driving power supply circuits being electrically connected by a corresponding single shared common power supply line to all of the optical switch units of the corresponding group so as to supply current to the heater elements thereof; and
a plurality of driving electronic devices operatively coupled to the one or more optical switch units so as to selectively drive the heater elements to vary the refractive index of the optical waveguide circuit by thermal optic effect, the driving electronic devices being provided for every corresponding group of said optical switch units, the driving electronic devices being mounted on the substrate.

7. The optical module as claimed in claim 6, wherein the driving electronic devices are integrated on the substrate in the form of a bare chip.

8. The optical module as claimed in claim 6, wherein wiring from each driving electronic device is grouped and integrated on the substrate.

9. The optical module as claimed in claim 6, wherein the optical waveguide circuit comprises an optical switch.

10. The optical module as claimed in claim 6, wherein the optical waveguide circuit comprises a variable optical attenuator.

11. The optical module as claimed in claim 6, wherein the driving electronic devices comprise integrated circuits.

12. The optical module as claimed in claim 6, wherein the driving electronic devices comprise a bare chip mounted on the optical waveguide circuit.

13. An optical module comprising:
an optical waveguide circuit mounted on a substrate, the optical waveguide circuit and the substrate being silica based, the optical waveguide circuit having a refractive index that can be varied by using a thermal-optic effect;
a plurality of optical switch units having heater elements mounted on the substrate and disposed adjacent the optical waveguide circuit, wherein the optical switch units are divided into separate multiple groups, one or more of the groups having a plurality of the optical switch units, each optical switch unit having at least two heater elements;
analog adjustable driving power supply circuits for supplying current to the heater elements of the optical switch units, wherein each analog adjustable driving power supply circuit is electrically connected to all of the optical switch units within a corresponding group, each one of the analog adjustable driving power supply circuits being electrically connected by a corresponding single shared line to all of the optical switch units of the corresponding group so as to supply current to the heater elements thereof; and
a plurality of driving electronic devices operatively coupled to the one or more optical switch units so as to selectively drive the heater elements to vary the refractive index of the optical waveguide circuit by thermal optic effect, the driving electronic devices being provided for every corresponding group of said optical switch units, the driving electronic devices being mounted on the substrate.

* * * * *